(12) United States Patent
Chiba et al.

(10) Patent No.: US 10,340,519 B2
(45) Date of Patent: Jul. 2, 2019

(54) NEGATIVE ELECTRODE ACTIVE MATERIAL FOR ELECTRIC DEVICE AND ELECTRIC DEVICE USING THE SAME

(71) Applicant: Nissan Motor Co., Ltd., Yokohama-shi, Kanagawa (JP)

(72) Inventors: Nobutaka Chiba, Kanagawa (JP); Tomohiro Kaburagi, Kanagawa (JP); Youichi Yoshioka, Kanagawa (JP); Manabu Watanabe, Kanagawa (JP); Masaya Arai, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/774,948

(22) PCT Filed: Nov. 10, 2016

(86) PCT No.: PCT/JP2016/083439
§ 371 (c)(1),
(2) Date: May 9, 2018

(87) PCT Pub. No.: WO2017/082369
PCT Pub. Date: May 18, 2017

(65) Prior Publication Data
US 2018/0366725 A1 Dec. 20, 2018

(30) Foreign Application Priority Data

Nov. 10, 2015 (JP) ................................ 2015-220803

(51) Int. Cl.
| | |
|---|---|
| *B22F 9/04* | (2006.01) |
| *H01M 4/02* | (2006.01) |
| *H01M 4/04* | (2006.01) |
| *H01M 4/38* | (2006.01) |

(Continued)

(52) U.S. Cl.
CPC .............. *H01M 4/386* (2013.01); *B22F 9/04* (2013.01); *H01M 4/04* (2013.01); *H01M 4/134* (2013.01);
(Continued)

(58) Field of Classification Search
CPC .............................. H01M 4/386; H01M 4/387
See application file for complete search history.

(56) References Cited

U.S. PATENT DOCUMENTS

| | | | |
|---|---|---|---|
| 2004/0241548 A1* | 12/2004 | Nakamoto | .......... H01M 4/0452 429/231.95 |
| 2006/0040182 A1 | 2/2006 | Kawakami et al. | |

(Continued)

FOREIGN PATENT DOCUMENTS

| | | |
|---|---|---|
| JP | 2001256974 A | 9/2001 |
| JP | 2001297757 A | 10/2001 |

(Continued)

*Primary Examiner* — Matthew J Merkling
(74) *Attorney, Agent, or Firm* — Young Basile Hanlon & MacFarlane, P.C.

(57) ABSTRACT

To provide a means capable of improving the cycle durability of an electric device such as a lithium ion secondary battery. A negative electrode active material containing a silicon-containing alloy having ternary alloy composition represented by Si—Sn-M (M is one or two or more transition metal elements) or quaternary alloy composition represented by Si—Sn-M-Al (M is one or two or more transition metal elements) and having a structure wherein an a-Si phase containing amorphous or low crystalline silicon containing tin in a silicon crystal structure in form of a solid solution is dispersed in a silicide phase containing a silicide of a transition metal as a main component is used in an electric device. The negative electrode active material improves the cycle durability of an electric device such as a lithium ion secondary battery.

21 Claims, 12 Drawing Sheets

(51) Int. Cl.
*H01M 4/46* (2006.01)
*H01M 4/134* (2010.01)
*H01M 10/0525* (2010.01)

(52) U.S. Cl.
CPC ........... *H01M 4/387* (2013.01); *H01M 4/463* (2013.01); *B22F 2009/041* (2013.01); *B22F 2009/043* (2013.01); *B22F 2302/45* (2013.01); *H01M 4/0404* (2013.01); *H01M 10/0525* (2013.01); *H01M 2004/027* (2013.01); *H01M 2220/20* (2013.01)

(56) References Cited

U.S. PATENT DOCUMENTS

| | | |
|---|---|---|
| 2006/0102472 A1* | 5/2006 | Bito ................ H01M 4/134 204/293 |
| 2007/0148544 A1 | 6/2007 | Le |
| 2008/0113271 A1 | 5/2008 | Ueda et al. |
| 2009/0053589 A1 | 2/2009 | Obrovac et al. |
| 2010/0119942 A1 | 5/2010 | Kumar |
| 2012/0058341 A1 | 3/2012 | Itahara et al. |
| 2014/0141334 A1 | 5/2014 | Yoo et al. |
| 2018/0013140 A1 | 1/2018 | Kaburagi et al. |

FOREIGN PATENT DOCUMENTS

| | | |
|---|---|---|
| JP | 2004311429 A | 11/2004 |
| JP | 2015520725 A | 7/2015 |
| JP | 2015176676 A | 10/2015 |
| KR | 20080081283 A | 9/2008 |
| WO | 2006129415 A1 | 12/2006 |
| WO | 2007055007 A1 | 5/2007 |
| WO | 2016098209 A1 | 6/2016 |

\* cited by examiner (EXAMPLE 1-1) HAADF-STEM-EDX ANALYSIS PHOTOGRAPHS (HIGH MAGNIFICATION)

(EXAMPLE 1-1) DIFFRACTION PATTERN/EDX SPECTRUM OF SILICIDE PHASE

FIG.3C
(EXAMPLE 1-1) DIFFRACTION PATTERN/EDX SPECTRUM OF a-Si PHASE

HAADF-STEM Image

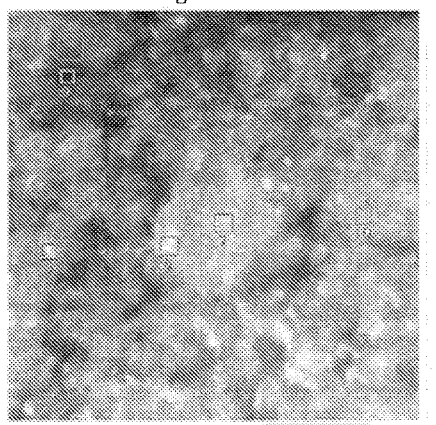

25 nm

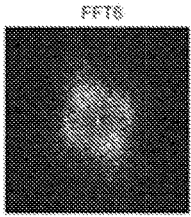
FFT8

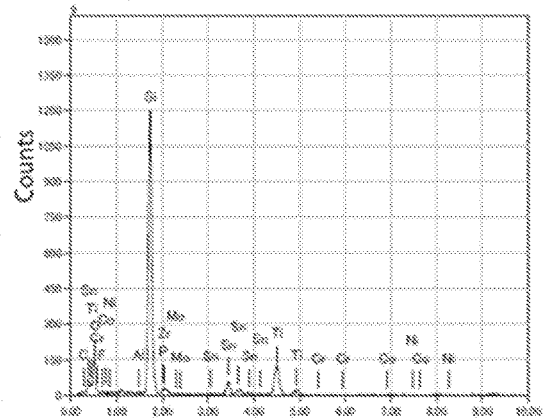

Measurement Parameter    keV
Accelerating voltage: 200.0 kV    Irradiation current: 2.00000 nA
Duration time: 20.97 sec    Dead time: 4%
Effective time: 20.00 sec    Count ratio: 1080 counts/sec

| Element | (keV) | Count | mass% | σ | atom% | K |
|---|---|---|---|---|---|---|
| Total | | | 100.00 | | 100.00 | |

FIG.3D
(EXAMPLE 1-1) HAADF-STEM-EDX ANALYSIS PHOTOGRAPHS (LOW MAGNIFICATION)

HAADF-STEM Image      Red;Ti, Green;Sn, Blue;Si

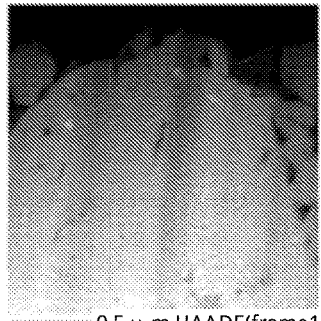
0.5 μm HAADF(frame1)

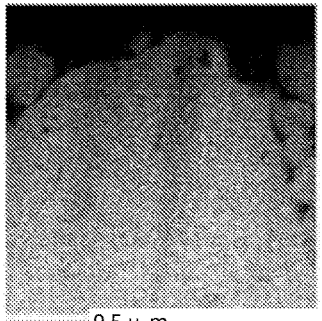
0.5 μm

Sn-K MAP     Si-K MAP     Ti-K MAP 0.5 μm   Sn L     0.5 μm   Si K     0.5 μm   Ti K (EXAMPLE 1-2) HAADF-STEM-EDX ANALYSIS PHOTOGRAPHS (HIGH MAGNIFICATION)

(EXAMPLE 1-2) DIFFRACTION PATTERN/EDX SPECTRUM OF SILICIDE PHASE

FIG.4C
(EXAMPLE 1-2) DIFFRACTION PATTERN/EDX SPECTRUM OF a-Si PHASE
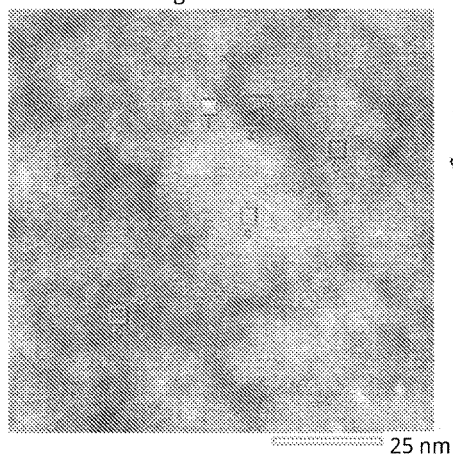
HAADF-STEM Image
25 nm
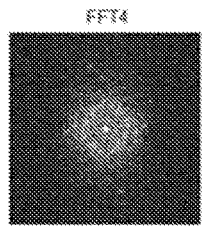
FFT4
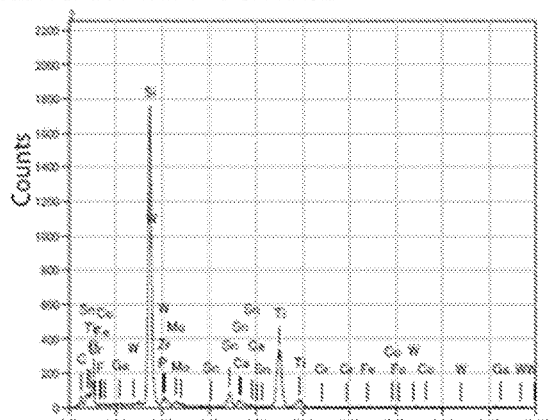
Measurement Parameter   keV
Accelerating voltage: 200.0 kV   Irradiation current: 2.00000 nA
Duration time: 21.35 sec   Dead time: 6%
Effective time: 20.00 sec   Count ratio: 1652 counts/sec
| Element | (keV) | Count | mass% | σ | atom% | K |
|---|---|---|---|---|---|---|
| O K | 0.52 | 764.91 | 5.05 | 0.26 | 11.64 | 1.65 |
| F K | | | | | | |
| Si K | 1.74 | 17726.43 | 57.31 | 0.83 | 68.30 | 1.00 |
| P K | 2.01 | 18.60 | 0.60 | 0.13 | 0.62 | 1.00 |
| Ti K | 4.51 | 3789.63 | 22.43 | 0.46 | 15.07 | 1.02 |
| Sn L | 3.44 | 873.71 | 14.54 | 0.88 | 4.10 | 3.73 |
| Total | | | 100.00 | | 100.00 | |
FIG.4D
(EXAMPLE 1-2) HAADF-STEM-EDX ANALYSIS PHOTOGRAPHS (LOW MAGNIFICATION)
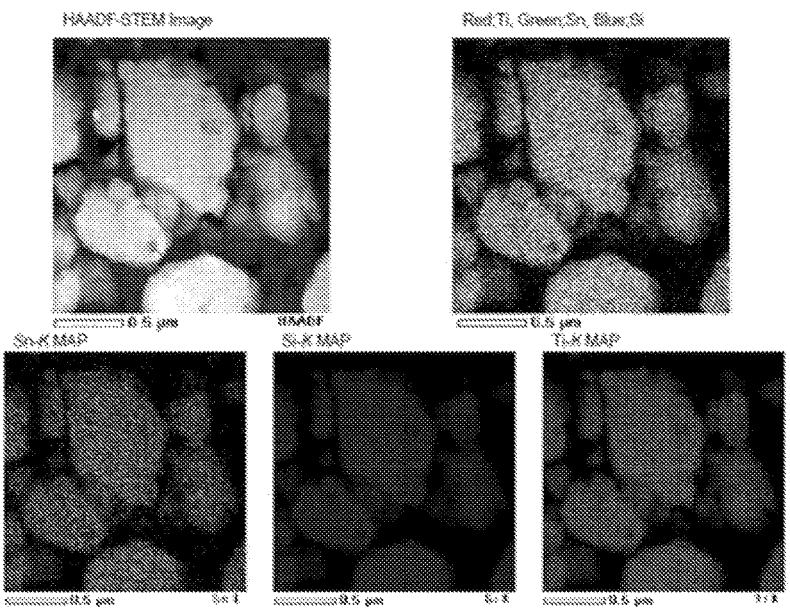

FIG.5A
(COMPARATIVE EXAMPLE) HAADF-STEM-EDX ANALYSIS PHOTOGRAPHS
(HIGH MAGNIFICATION)
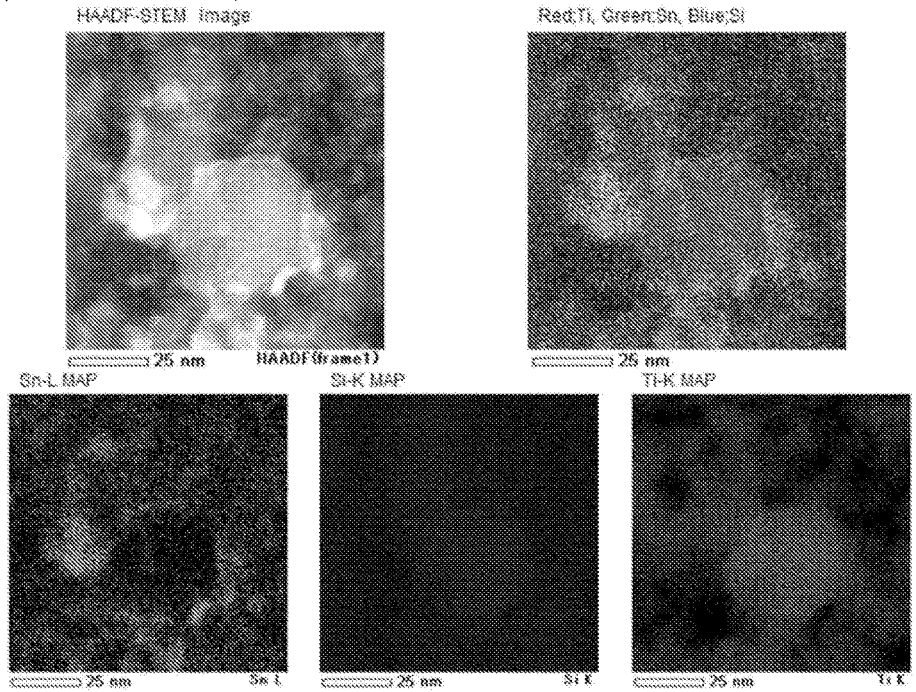
FIG.5B
(COMPARATIVE EXAMPLE) DIFFRACTION PATTERN/EDX SPECTRUM OF SILICIDE PHASE
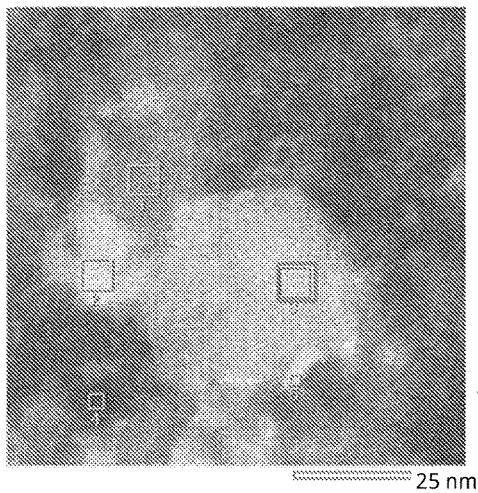
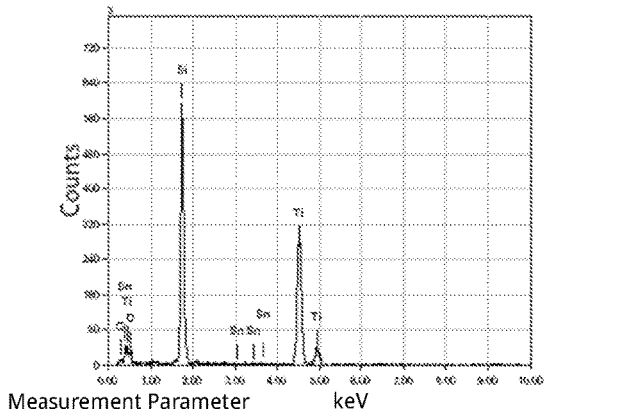

(COMPARATIVE EXAMPLE) DIFFRACTION PATTERN/EDX SPECTRUM OF a-Si PHASE (COMPARATIVE EXAMPLE) HAADF-STEM-EDX ANALYSIS PHOTOGRAPHS
(LOW MAGNIFICATION)

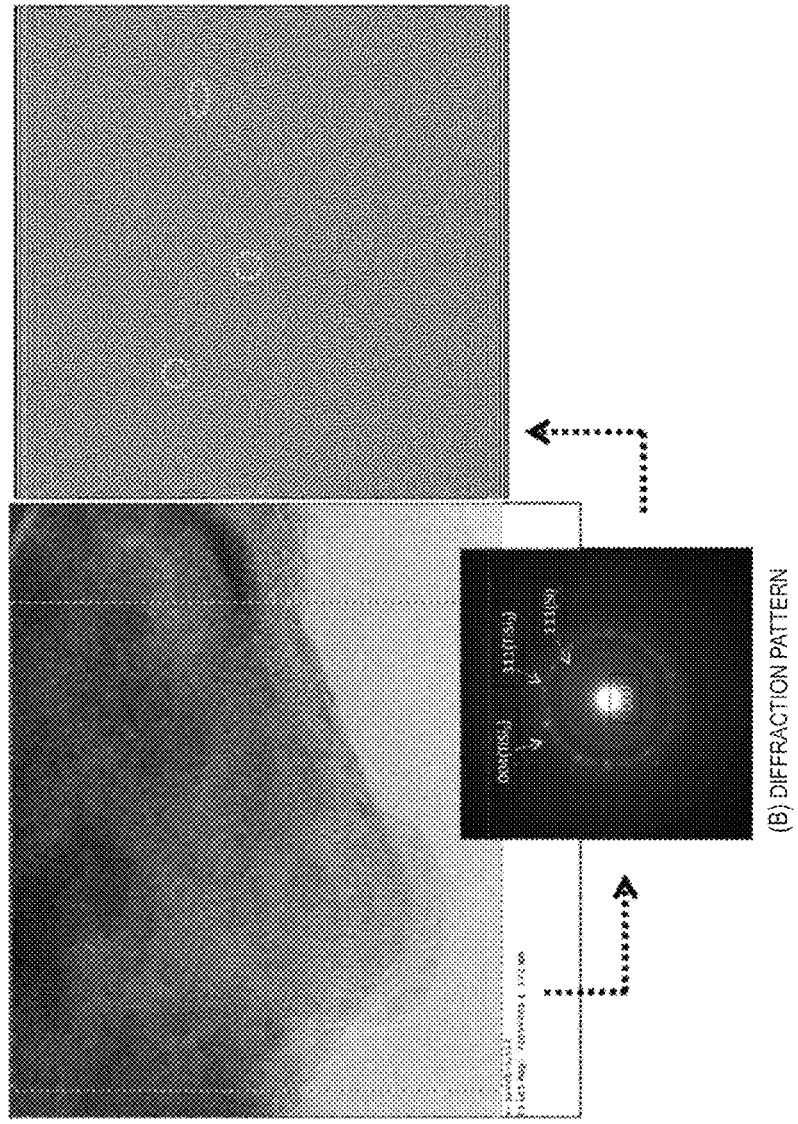
FIG.6 (EXAMPLE 1-1)
(A) HAADF-STEM OBSERVATION IMAGE
(B) DIFFRACTION PATTERN
(C) INVERSE FOURIER TRANSFORM IMAGE (EXAMPLE 3-1) HAADF-STEM-EDX ANALYSIS PHOTOGRAPHS
(HIGH MAGNIFICATION; Ti, Sn, AND Si)

(EXAMPLE 3-1) HAADF-STEM-EDX ANALYSIS PHOTOGRAPHS
(HIGH MAGNIFICATION; Ti, Al, AND Si)

NEGATIVE ELECTRODE ACTIVE MATERIAL FOR ELECTRIC DEVICE AND ELECTRIC DEVICE USING THE SAME

CROSS-REFERENCE TO RELATED APPLICATION(S)

The present application is based on Japanese Patent Application No. 2015-220803 filed on Nov. 10, 2015, the entire content of which is herein incorporated by reference.

TECHNICAL FIELD

The present invention relates to a negative electrode active material for electric device, and an electric device using the same. The negative electrode active material for electric device and the electric device using the same according to the present invention are used in a driving power source and an auxiliary power source for motors of vehicles such as electric vehicles, fuel cell vehicles, and hybrid electric vehicles as secondary batteries, capacitors, and the like.

BACKGROUND

In recent years, cut down of the amount of carbon dioxide has been ardently desired in order to cope with air pollution and global warming. In the motor vehicle industry, cut down of carbon dioxide emissions due to introduction of electric vehicles (EV) and hybrid electric vehicles (HEV) has been highly expected, and development of electric devices such as secondary batteries for driving motors, which hold the key to practical use of these has been actively carried out.

The secondary batteries for driving motors are required to exhibit extremely high-output characteristics and high energy as compared to consumer lithium ion secondary batteries to be used in mobile phones, notebook computers, and the like. Hence, lithium ion secondary batteries having the highest theoretical energy among all the batteries have attracted attention, and development thereof is rapidly advanced at present.

A lithium ion secondary battery generally has a configuration in which a positive electrode in which a positive electrode active material and the like are coated on both sides of a positive electrode current collector by using a binder and a negative electrode in which a negative electrode active material and the like are coated on both sides of a negative electrode current collector by using a binder are connected to each other via an electrolyte layer and housed in a battery case.

Hitherto, a carbon and graphite-based material, which is advantageous from the viewpoint of lifespan of charge and discharge cycles and cost, has been used in the negative electrode of a lithium ion secondary battery. However, in the case of a carbon and graphite-based negative electrode material, charge and discharge proceed by occlusion and release of lithium ions into and from the graphite crystals, and there is thus a disadvantage that a charge and discharge capacity that is equal to or higher than the theoretical capacity, 372 mAh/g, to be obtained from $LiC_6$ of the maximum lithium-introduced compound is not obtained. For this reason, it is difficult to obtain a capacity and an energy density which satisfy the practical use level of a vehicle application from a carbon and graphite-based negative electrode material.

In contrast, a battery using a material to be alloyed with Li in the negative electrode is expected as a negative electrode material in a vehicle application since the energy density is improved as compared to a conventional carbon and graphite-based negative electrode material. For example, an Si material occludes and releases 3.75 mol of lithium ions per 1 mol as in the following Reaction Formula (A) in charge and discharge, and the theoretical capacity is 3600 mAh/g in $Li_{15}Si_4$ (=$Li_{3.75}Si$).

[Chemical Formula 1]

$$Si + 3.75Li^+ + e^- \leftrightarrows Li_{3.75}Si \quad (A)$$

However, in a lithium ion secondary battery using a material to be alloyed with Li in the negative electrode, expansion and contraction of the negative electrode at the time of charge and discharge is great. For example, the volume expansion in the case of occluding a Li ion is about 1.2 times for a graphite material, but a great volume change (about 4 times) occurs for the Si material since the amorphous state is converted to a crystalline state when Si and Li are alloyed, and there is thus a problem that the cycle lifespan of the electrode decreases. In addition, in the case of an Si negative electrode active material, the capacity and the cycle durability have a trade-off relationship, and there is thus a problem that it is difficult to improve the cycle durability while having a high capacity.

Here, WO 2006/129415 A discloses an invention aimed to provide a nonaqueous electrolyte secondary battery including a negative electrode pellet having a high capacity and an excellent cycle lifespan. Specifically, a silicon-containing alloy is disclosed which is obtained by mixing and wet pulverizing a silicon powder and a titanium powder by a mechanical alloying method and in which a material including a first phase containing silicon as a main body and a second phase containing a silicide of titanium ($TiSi_2$ or the like) is used as a negative electrode active material. It is also disclosed that at least either of these two phases is amorphous or low crystalline.

SUMMARY

According to the investigations of the present inventors, it has been demonstrated that the cycle durability is not sufficient in some cases though it is described that favorable cycle durability can be exhibited in an electric device such as a lithium ion secondary battery using the negative electrode pellet described in WO 2006/129415 A.

Accordingly, an object of the present invention is to provide a means capable of improving the cycle durability of an electric device such as a lithium ion secondary battery.

In order to solve the above problem, the present inventors have carried out intensive researches. As a result, it has been found out that the above problem can be solved by using a silicon-containing alloy which has an alloy composition of a ternary system represented by Si—Sn-M (M is one or two or more transition metal elements) or a quaternary system represented by Si—Sn-M-Al (M is one or two or more transition metal elements) and a structure in which an a-Si phase containing amorphous or low crystalline silicon containing tin in the silicon crystal structure in the form of a solid solution is dispersed in a silicide phase containing a silicide of a transition metal as a main component as a negative electrode active material for electric device, thereby completing the present invention.

In other words, the present invention relates to a negative electrode active material for electric device containing a silicon-containing alloy. Moreover, the silicon-containing alloy has a composition represented by the following Chemical Formula (1):

$$Si_x Sn_y M_z Al_w A_a \quad (1)$$

(in Chemical Formula (1),

A is unavoidable impurities,

M is one or two or more transition metal elements, x, y, z, w and a represent values of percent by mass, wherein $0 < y < 100$, $0 < z < 100$, $0 \le w < 100$, and x and a are the remainder). In addition, the silicon-containing alloy is characterized by having a structure in which an a-Si phase containing amorphous or low crystalline silicon containing tin in the silicon crystal structure in the form of a solid solution is dispersed in a silicide phase containing a silicide of a transition metal as a main component.

BRIEF DESCRIPTION OF THE DRAWINGS

FIG. 3C is a photograph and a graph which illustrate the analysis results for the microtextural structure of the a-Si phase of the negative electrode active material (silicon-containing alloy) of Example 1-1. The upper left photograph in FIG. 3C is an observation image of the negative electrode active material (silicon-containing alloy) of Example 1-1 by HAADF-STEM, which is the same as the upper left photograph in FIG. 3A. In addition, the lower left photograph in FIG. 3C is a diffraction pattern acquired by subjecting the image of a portion enclosed by a bold line (a portion at which Ti is not present but Si is present) in the observation image to fast Fourier transformation. Moreover, the graph and table on the right side in FIG. 3C are the EDX spectrum obtained for the same portion.

FIG. 3D is a low magnification photograph which illustrates the observation results for the microtextural structure of the negative electrode active material (silicon-containing alloy) of Example 1-1 by HAADF-STEM.

FIG. 4C is a photograph and a graph which illustrate the analysis results for the microtextural structure of the a-Si phase of the negative electrode active material (silicon-containing alloy) of Example 1-2. The upper left photograph in FIG. 4C is an observation image of the negative electrode active material (silicon-containing alloy) of Example 1-2 by HAADF-STEM, which is the same as the upper left photograph in FIG. 4A. In addition, the lower left photograph in FIG. 4C is a diffraction pattern acquired by subjecting the image of a portion enclosed by a bold line (a portion at which Ti is not present but Si is present) in the observation image to fast Fourier transformation. Moreover, the graph and table on the right side in FIG. 4C are the EDX spectrum obtained for the same portion.

FIG. 4D is a low magnification photograph which illustrates the observation results for the microtextural structure of the negative electrode active material (silicon-containing alloy) of Example 1-2 by HAADF-STEM.

FIG. 5A is a high magnification photograph which illustrates the observation results for the microtextural structure of the negative electrode active material (silicon-containing alloy) of Comparative Example by HAADF-STEM. The upper left photograph in FIG. 5A is an observation image (high magnification) of the negative electrode active material (silicon-containing alloy) of Comparative Example by a high angle annular dark field scanning transmission electron microscope (HAADF-STEM). In addition, the upper right photograph in FIG. 5A is an image obtained by conducting element intensity mapping of the same visual field as the observation image by EDX (energy dispersive X-ray spectroscopy). Moreover, the lower photographs in FIG. 5A are mapping images for the respective elements of Sn, Si, and Ti from the left.

FIG. 5B is a photograph and a graph which illustrate the analysis results for the microtextural structure of the silicide phase of the negative electrode active material (silicon-containing alloy) of Comparative Example. The upper left photograph in FIG. 5B is an observation image of the negative electrode active material (silicon-containing alloy) of Comparative Example by HAADF-STEM, which is the same as the upper left photograph in FIG. 5A. In addition, the lower left photograph in FIG. 5B is a diffraction pattern acquired by subjecting the image of a portion enclosed by a bold line (a portion considered to have a silicide (TiSi$_2$) phase) in the observation image to fast Fourier transformation. Moreover, the graph and table on the right side in FIG. 5B are the EDX spectrum obtained for the same portion.

FIG. 6 is a photograph for explaining a method of measuring the size of the periodic array region (MRO) in the amorphous region (a-Si phase) and the distance between Si regular tetrahedrons of the negative electrode active material (silicon-containing alloy) of Example 1-1. Specifically, FIG. 6(A) is an enlarged photograph of the lattice image of the negative electrode active material (silicon-containing alloy) of Example 1-1 obtained by HAADF-STEM. In addition, FIG. 6(B) is a photograph which illustrates a diffraction pattern acquired by subjecting lattice image (HAADF-STEM image) of the silicon-containing alloy of Example 1-1 illustrated in FIG. 6(A) to fast Fourier transformation (FFT) processing. Moreover, FIG. 6(C) is a photograph which illustrates an inverse Fourier transform image acquired by subjecting the extracted pattern from which the data of the diffraction ring portion corresponding to the Si (220) plane in FIG. 6(B) is extracted to inverse fast Fourier transformation processing.

DETAILED DESCRIPTION

Figure 1:
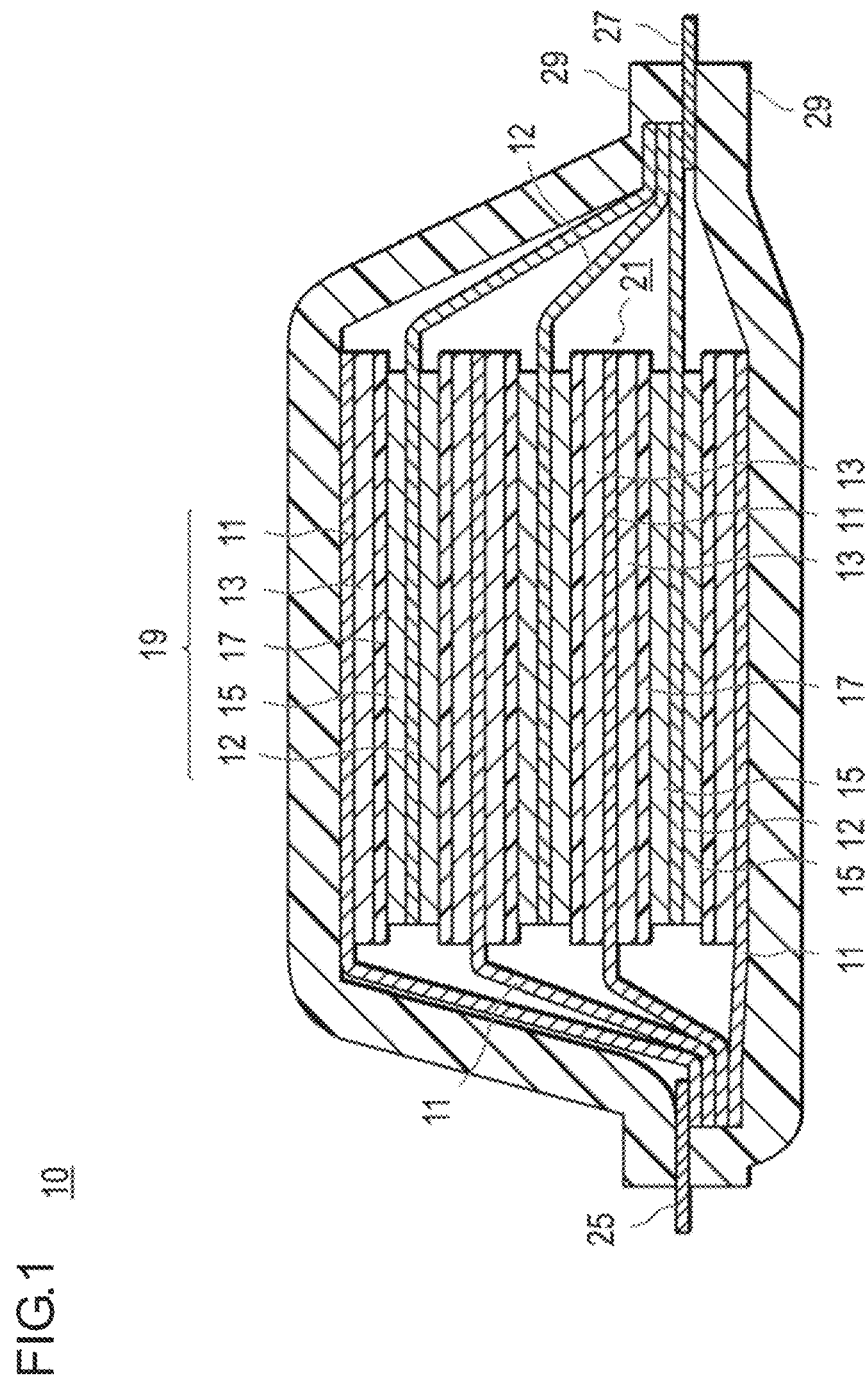
FIG. 1 is a cross-sectional schematic view which schematically illustrates the outline of a stacked type flat non-bipolar lithium ion secondary battery of a representative embodiment of the electric device according to the present invention.

According to an aspect of the present invention, a negative electrode active material for electric device containing a silicon-containing alloy having a composition represented by the following Chemical Formula (1):

$$Si_xSn_yM_zAl_wA_a \quad (1)$$

(in Chemical Formula (1),
A is unavoidable impurities,
M is one or two or more transition metal elements,
x, y, z, w and a represent values of percent by mass, wherein 0<y<100, 0<z<100, 0≤w<100, and x and a are the remainder) and a structure in which an a-Si phase containing amorphous or low crystalline silicon containing tin in the silicon crystal structure in the form of a solid solution is dispersed in a silicide phase containing a silicide of a transition metal as a main component is provided.

In the silicon-containing alloy constituting the negative electrode active material according to the present invention, amorphization of the a-Si phase is sufficiently advanced by having a predetermined microtextural structure. In other words, the size of the periodic array region (Middle-Range Order; MRO) in the amorphous region (a-Si phase) has a small value. This leads to relaxation of expansion of the active material particles at the time of charge and discharge while suppressing the phase transition from an amorphous state to a crystalline state (crystallization to Li$_{15}$Si$_4$) when Si is alloyed with Li at the time of charge. In addition, the distance between Si regular tetrahedrons in the amorphous region (a-Si phase) increases as the silicon-containing alloy has a configuration in which tin (and also aluminum in some cases) is contained in the a-Si phase in the form of a solid solution. By this, the distance between Si—Si increases and the reversible intercalation and deintercalation reaction of lithium ions at the time of charge and discharge is likely to proceed. In other words, the Si—Si bond is maintained in the discharged state (Li-deintercalated state) even when the intercalation and deintercalation of Li is repeated in the microstructure of the Si phase by charge and discharge. Furthermore, as the silicide phase constitutes the sea (continuous phase) of a sea-island structure, it is possible to further improve the electron conductivity of the negative electrode active material (silicon-containing alloy) and also to prevent cracking of the active material by relaxing the stress at the time of expansion of the a-Si phase. According to the negative electrode active material of the present invention, improvement in cycle durability of the electric device is brought about as these actions are exerted in combination.

Hereinafter, embodiments of a negative electrode active material for electric device and an electric device using the same of the present invention will be described with reference to the drawings. However, the technical scope of the present invention should be determined based on the description of claims and is not limited to only the following embodiments. Incidentally, in the description of the drawings, the same elements are denoted by the same reference numerals, and duplicate descriptions are omitted. In addition, the dimensional ratios of the drawings are exaggerated for convenience of description and may differ from actual ratios.

Hereinafter, a basic configuration of an electric device to which the negative electrode active material for electric device of the present invention can be applied will be described with reference to the drawings. In the present embodiment, a lithium ion secondary battery will be described as an example of an electric device.

First, in a negative electrode for lithium ion secondary battery of a representative embodiment of a negative electrode containing the negative electrode active material for electric device according to the present invention, and a lithium ion secondary battery using the same, the voltage of the cell (single battery layer) is great and a high-energy density and a high-output density can be achieved. For this reason, a lithium ion secondary battery using the negative electrode active material for lithium ion secondary battery of the present embodiment is excellent for driving power source and auxiliary power source of a vehicle. As a result, it can be suitably used as a lithium ion secondary battery for driving power and the like of a vehicle. In addition to this, it can also be sufficiently applied to a lithium ion secondary battery for mobile devices such as mobile phones.

That is, the lithium ion secondary battery to be a target of the present embodiment may be one that is formed by using the negative electrode active material for lithium ion secondary battery of the present embodiment to be described below, and other constituent requirements thereof are not particularly limited.

For example, in the case of distinguishing the lithium ion secondary battery by the form and structure, it can be applied to any conventionally known form and structure such as a stacked type (flat type) battery and a wound type (cylindrical type) battery. It is advantageous to employ a stacked type (flat type) battery structure from the viewpoint of cost and workability since long-term reliability can be secured by a simple sealing technique such as thermocompression bonding.

In addition, in the case of considering the electrical connection form (electrode structure) in the lithium ion secondary battery, the lithium ion secondary battery can be applied to both a non-bipolar (internal parallel connection type) battery and a bipolar (internal series connection type) battery.

In the case of distinguishing the lithium ion secondary battery by the type of the electrolyte layer therein, the lithium ion secondary battery can also be applied to batteries having any conventionally known type of electrolyte layer such as a solution electrolyte type battery using a solution electrolyte such as a nonaqueous electrolytic solution in the electrolyte layer and a polymer battery using a polymer electrolyte in the electrolyte layer. The polymer battery is classified into a gel electrolyte type battery using a polymer gel electrolyte (also simply referred to as a gel electrolyte) and a solid polymer (all-solid) type battery using a polymer solid electrolyte (also simply referred to as a polymer electrolyte).

Accordingly, in the following description, a non-bipolar (internal parallel connection type) lithium ion secondary battery using the negative electrode active material for lithium ion secondary battery of the present embodiment will be significantly briefly described with reference to the drawings. However, the technical scope of the lithium ion secondary battery of the present embodiment is not limited to these.

<Overall Structure of Battery>

FIG. 1 is a cross-sectional schematic view which schematically illustrates the overall structure of a flat type (stacked type) lithium ion secondary battery (hereinafter, also simply referred to as the "stacked type battery") of a representative embodiment of the electric device according to the present invention.

As illustrated in FIG. 1, a stacked type battery 10 of the present embodiment has a structure in which a substantially rectangular power generating element 21 in which a charge and discharge reaction actually proceeds is sealed in the interior of a laminate sheet 29 of an outer package. Here, the power generating element 21 is configured to stack a positive electrode in which a positive electrode active material layer 15 is disposed on both sides of a positive electrode current collector 12, an electrolyte layer 17, and a negative electrode in which a negative electrode active material layer 13 is disposed on both sides of a negative electrode current collector 11. Specifically, the negative electrode, the electrolyte layer, and the positive electrode are stacked in this order such that one positive electrode active material layer 15 and the adjacent negative electrode active material layer 13 face each other via the electrolyte layer 17.

By this, the adjacent positive electrode, electrolyte layer, and negative electrode constitute one single battery layer 19. Hence, it can also be said that the stacked type battery 10 illustrated in FIG. 1 has a configuration in which a plurality of single battery layers 19 are stacked to be electrically connected in parallel. Incidentally, the positive electrode active material layer 15 is disposed only on one side of each of the outermost positive electrode current collectors to be positioned at both outermost layers of the power generating element 21, but the active material layer may be provided on both sides thereof. That is, a current collector which has an active material layer only on one side and is thus dedicated to the outermost layer is not prepared but a current collector having an active material layer on both sides may be used as it is as the outermost current collector. In addition, the positive electrode and the negative electrode may be reversely disposed from FIG. 1 so that the outermost negative electrode current collector is positioned at both outermost layers of the power generating element 21, and the negative electrode active material layer may be disposed on one side or both sides of the outermost negative electrode current collector.

A positive electrode current collecting plate 27 and a negative electrode current collecting plate 25 which are electrically connected to the respective electrodes (the positive electrode and the negative electrode) have a structure in which they are respectively attached to the positive electrode current collector 12 and the negative electrode current collector 11 and led to the outside of the laminate sheet 29 so as to be sandwiched between the end portions of the laminate sheet 29. The positive electrode current collecting plate 27 and the negative electrode current collecting plate 25 may be respectively attached to the positive electrode current collector 12 and the negative electrode current collector 11 of the respective electrodes via a positive electrode lead and a negative electrode lead (not illustrated) by ultrasonic welding, resistance welding, or the like if necessary.

The lithium ion secondary battery described above is characterized by a negative electrode. The important constituent members of the battery including the negative electrode will be described below.

<Active Material Layer>

The active material layer 13 or 15 contains an active material, and it further contains other additives if necessary.

[Positive Electrode Active Material Layer]

The positive electrode active material layer 15 contains a positive electrode active material.

(Positive Electrode Active Material)

Examples of the positive electrode active material may include lithium-transition metal composite oxides such as $LiMn_2O_4$, $LiCoO_2$, $LiNiO_2$, $Li(Ni\text{—}Mn\text{—}Co)O_2$, and those in which a part of these transition metals are substituted with other elements, lithium-transition metal phosphate compounds, and lithium-transition metal sulfate compounds. Depending on the cases, two or more kinds of positive electrode active materials may be used concurrently. A lithium-transition metal composite oxide is preferably used as the positive electrode active material from the viewpoint of capacity and output characteristics. A composite oxide containing lithium and nickel is more preferably used, and $Li(Ni\text{—}Mn\text{—}Co)O_2$ and those in which a part of these transition metals are substituted with other elements (hereinafter, also simply referred to as the "NMC composite oxide") are still more preferably used. The NMC composite oxide has a layered crystal structure in which a lithium atom layer and a transition metal (Mn, Ni, and Co are orderly disposed) atom layer are alternately stacked via an oxygen atom layer, one Li atom is contained per one atom of the transition metal M, the amount of Li that can be taken out is twofold that of spinel type lithium manganese oxide, that is, the supply ability is twofold, and the NMC composite oxide can thus have a high capacity.

As described above, the NMC composite oxide also includes a composite oxide in which a part of the transition metal elements is substituted with other metal elements. Examples of the other elements in that case may include Ti, Zr, Nb, W, P, Al, Mg, V, Ca, Sr, Cr, Fe, B, Ga, In, Si, Mo, Y, Sn, V, Cu, Ag, and Zn, the other elements are preferably Ti, Zr, Nb, W, P, Al, Mg, V, Ca, Sr, and Cr, the other elements are more preferably Ti, Zr, P, Al, Mg, and Cr, and from the viewpoint of improving the cycle characteristics, the other elements are still more preferably Ti, Zr, Al, Mg and Cr.

The NMC composite oxide preferably has a composition represented by General Formula (1): $Li_aNi_bMn_cCo_dM_xO_2$ (where a, b, c, d, and x satisfy $0.9 \le a \le 1.2$, $0 < b < 1$, $0 < c \le 0.5$, $0 < d \le 0.5$, $0 \le x \le 0.3$, and $b+c+d=1$. M is at least one kind of element selected from Ti, Zr, Nb, W, P, Al, Mg, V, Ca, Sr, or Cr) since the theoretical discharge capacity is high. Here, a represents the atomic ratio of Li, b represents the atomic ratio of Ni, c represents the atomic ratio of Mn, d represents the atomic ratio of Co, and x represents the atomic ratio of M. From the viewpoint of cycle characteristics, it is preferable that $0.4 \le b \le 0.6$ be satisfied in General Formula (1). Incidentally, the composition of the respective elements can be measured by, for example, plasma (ICP) emission spectrometry.

In general, it is known that nickel (Ni), cobalt (Co), and manganese (Mn) contribute to the capacity and output characteristics from the viewpoint of improving purity of the material and improving electron conductivity. Ti or the like partially substitutes the transition metal in the crystal lattice. From the viewpoint of cycle characteristics, it is preferable that a part of the transition element be substituted with another metal element, and it is particularly preferable that $0 < x \le 0.3$ in General Formula (1). It is considered that the crystal structure is stabilized by a solid solution formed by at least one kind selected from the group consisting of Ti, Zr, Nb, W, P, Al, Mg, V, Ca, Sr, and Cr, and as a result, a decrease in capacity of the battery can be prevented even when charge and discharge are repeated and excellent cycle characteristics can be realized.

As a more preferred embodiment, it is preferable that b, c, and d satisfy $0.44 \le b \le 0.51$, $0.27 \le c \le 0.31$, and $0.19 \le d \le 0.26$ in General Formula (1) from the viewpoint of improving the balance between capacity and lifespan characteristics. For example, $LiNi_{0.5}Mn_{0.3}Co_{0.2}O_2$ has a greater capacity per unit weight as compared to $LiCoO_2$, $LiMn_2O_4$, $LiNi_{1/3}Mn_{1/3}Co_{1/3}O_2$, and the like that have been proven in general consumer batteries, can improve the energy density, and thus has an advantage of being able to be used in fabrication of a compact and high capacity battery, and it is also preferable from the viewpoint of the cruising distance. Incidentally, $LiNi_{0.8}Co_{0.1}Al_{0.1}O_2$ is more advantageous from the viewpoint of a greater capacity, but it has a disadvantage from the viewpoint of lifespan characteristics. In contrast, $LiNi_{0.5}Mn_{0.3}Co_{0.2}O_2$ exhibits excellent lifespan characteristics comparable to $LiNi_{1/3}Mn_{1/3}CO_{1/3}O_2$.

Depending on the cases, two or more kinds of positive electrode active materials may be used concurrently. A lithium-transition metal composite oxide is preferably used as the positive electrode active material from the viewpoint of capacity and output characteristics. Incidentally, it is needless to say that a positive electrode active material other than those described above may be used.

The average particle diameter of the positive electrode active material contained in the positive electrode active material layer 15 is not particularly limited, but it is preferably from 1 to 30 μm and more preferably from 5 to 20 μm from the viewpoint of increasing the output.

The positive electrode active material layer 15 can contain a binder.

(Binder)

A binder is added for the purpose of binding the active materials with each other or the active material with the current collector and thus maintaining the electrode structure. The binder to be used in the positive electrode active material layer is not particularly limited, but examples thereof may include the following materials. Thermoplastic polymers such as polyethylene, polypropylene, polyethylene terephthalate (PET), polyether nitrile (PEN), polyacrylonitrile, polyimide, polyamide, polyamide-imide, cellulose, carboxymethyl cellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and any hydrogenated product thereof, and a styrene-isoprene-styrene block copolymer and any hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), and an epoxy resin. Among them, polyvinylidene fluoride, polyimide, styrene-butadiene, carboxymethyl cellulose, polypropylene, polytetrafluoroethylene, polyacrylonitrile, polyamide, and polyamide-imide are more preferable. These suitable binders exhibit excellent heat resistance, further have a significantly wide potential window, are stable to both the positive electrode potential and the negative electrode potential, and can be thus used in the active material layer. These binders may be used singly or two or more kinds thereof may be used concurrently.

The amount of binder contained in the positive electrode active material layer is not particularly limited as long as it is an amount in which the active material can be bound, but it is preferably from 0.5 to 15% by mass and more preferably from 1 to 10% by mass with respect to the active material layer.

The positive electrode (positive electrode active material layer) can be formed by any method of a kneading method, a sputtering method, a vapor deposition method, a CVD method, a PVD method, an ion plating method, or a thermal spraying method in addition to an ordinary method to coat a slurry.

[Negative Electrode Active Material Layer]

The negative electrode active material layer 13 contains a negative electrode active material.

(Negative Electrode Active Material)

In the present aspect, the negative electrode active material is composed of a silicon-containing alloy having an alloy composition of a ternary system represented by Si—Sn-M (M is one or two or more transition metal elements) or a quaternary system represented by Si—Sn-M-Al (M is one or two or more transition metal elements) and a structure in which an a-Si phase containing amorphous or low crystalline silicon containing tin in the silicon crystal structure in the form of a solid solution is dispersed in a silicide phase containing a silicide of a transition metal as a main component.

<Composition of Silicon-Containing Alloy>

As described above, the silicon-containing alloy constituting the negative electrode active material in the present embodiment first has an alloy composition of a ternary system represented by Si—Sn-M (M is one or two or more transition metal elements) or a quaternary system represented by Si—Sn-M-Al (M is one or two or more transition metal elements). More specifically, the silicon-containing alloy constituting the negative electrode active material in the present embodiment has a composition represented by the following Chemical Formula (1):

(1)

In Chemical Formula (1), A is unavoidable impurities, M is one or two or more transition metal elements, x, y, z, w and a represent values of percent by mass, wherein 0<y<100, 0<z<100, 0≤w<100, and x and a are remainders.

As is apparent from the Chemical Formula (1) above, when w=0, the silicon-containing alloy according to the present embodiment (having a composition of $Si_xSn_yM_zA_a$) is a ternary system of Si, Sn, and M (transition metal). In addition, when w>0, the silicon-containing alloy according to the present embodiment (having a composition of $Si_xSn_yM_zAl_wA_a$ (w>0)) is a quaternary system of Si, Sn, M (transition metal), and Al. It is possible to realize high cycle durability by having such a composition. In addition, in the present specification, the term "unavoidable impurities" means those that are present in the raw materials or unavoidably mixed into the Si-containing alloy during the production process. The unavoidable impurities are not originally required, but they are in a trace amount and do not affect the characteristics of the Si alloy, and they are thus allowable impurities.

In the present embodiment, it is particularly preferable to select Ti as an additive element (M; transition metal) to the negative electrode active material (silicon-containing alloy) since it is possible to suppress the phase transition from an amorphous state to a crystalline state when Si is alloyed with Li and thus to improve the cycle lifespan. In addition, by this, a negative electrode active material is formed to have a higher capacity than a conventional negative electrode active material (for example, a carbon-based negative electrode active material). Hence, according to a preferred embodiment of the present invention, it is preferable that M is titanium (Ti) in the composition represented by the Chemical Formula (1) above.

Here, in the Si-based negative electrode active material, the Si phase transition from an amorphous state to a crystalline state and a great volume change (about 4 times) occurs when Si is alloyed with Li at the time of charge. As a result, there is a problem that the active material particles themselves are broken and lose the function as an active material. Hence, by suppressing the phase transition from an amorphous state to a crystalline state of the Si phase at the time of charge, it is possible to suppress collapse of the particles themselves, to maintain the function (high capacity) as an active material, and also to improve the cycle lifespan.

As described above, the silicon-containing alloy (having a composition of $Si_xSn_yM_zA_a$) according to an embodiment of the present invention is a ternary system of Si, Sn, and M (transition metal). In such an embodiment, the total constituent ratio (mass ratios x, y, and z) of the respective constitutional elements is 100% by mass but the value of each of x, y, and z is not particularly limited. However, x is preferably 60≤x≤73, more preferably 60≤x≤70, still more preferably 60≤x≤67, and particularly preferably 60≤x≤65 from the viewpoint of balance between maintenance of durability against charge and discharge (intercalation and deintercalation of Li ions) and initial capacity. In addition, y is preferably 2≤y≤15, more preferably 2≤y≤10, and still more preferably 5≤y≤10 from the viewpoint that reversible intercalation and deintercalation of Li ions at the time of charge and discharge is possible by forming a solid solution in the Si phase and increasing the distance between Si regular tetrahedrons in the Si phase. Moreover, z is preferably 25≤z≤35, more preferably 27≤z≤33, and still more preferably 28≤z≤30 from the viewpoint of balance between maintenance of durability against charge and discharge (intercalation and deintercalation of Li ions) and initial capacity in the same manner as x. In other words, it is particularly preferable that 60≤x≤65, 5≤y≤10, and 28≤z≤30 in the present embodiment (the case in which w=0). It is easy to achieve the microtextural structure of the silicon-containing alloy according to the present embodiment by containing Ti in a relatively large amount and Sn in a certain amount while containing Si as a main component in this manner.

In such an embodiment, the total constituent ratio (mass ratios x, y, z, and w) of the respective constitutional elements is 100% by mass but the value of each of x, y, z, and w is not particularly limited. However, x is preferably $60 \leq x \leq 75$, more preferably $60 \leq x \leq 73$, still more preferably $60 \leq x \leq 71$, and particularly preferably $60 \leq x \leq 69$ from the viewpoint of balance between maintenance of durability against charge and discharge (intercalation and deintercalation of Li ions) and initial capacity. In addition, y is preferably $1 \leq y \leq 15$, more preferably $1.2 \leq y \leq 12$, and still more preferably $1.5 \leq y \leq 8$ from the viewpoint that reversible intercalation and deintercalation of Li ions at the time of charge and discharge is possible by forming a solid solution in the Si phase and increasing the distance between Si regular tetrahedrons in the Si phase. Furthermore, z is preferably $25 \leq z \leq 37$, more preferably $27 \leq z \leq 33$, and still more preferably $28 \leq z \leq 31$ from the viewpoint of balance between maintenance of durability against charge and discharge (intercalation and deintercalation of Li ions) and initial capacity in the same manner as x. Moreover, w is preferably $0.3 \leq w \leq 3$ and more preferably $0.5 \leq w \leq 2$ from the viewpoint that the distance between Si regular tetrahedrons increases, aluminum is uniformly dispersed in the a-Si phase, and thus Sn present in the a-Si phase is more finely dispersed as aluminum is contained in the a-Si phase in the form of a solid solution. Here, the effect as described above is obtained as Si—Ti significantly strongly bond with each other, Si—Sn repel each other, and Ti—Sn bond with each other. In a quaternary alloy of the second embodiment, in which a trace amount of Al is added to Si—Ti—Sn, Si—Al have the property that they are stably adjacent to each other in a liquid phase state as well as Si—Al repel each other, Ti—Al bond with each other, and Al acts in the same manner as Sn. It is considered that Al is more likely to be dissolved and dispersed in the Si phase than Sn and the distance between the regular tetrahedrons in the a-Si phase increases by this and it is thus possible to more effectively improve the durability against expansion and contraction of the a-Si phase accompanying charge and discharge (intercalation and deintercalation of Li ions). Furthermore, the conductivity of the a-Si phase is improved and charge and discharge (intercalation and deintercalation of Li ions) in the a-Si phase are likely to uniformly proceed as Al is uniformly dispersed in the a-Si phase since Al has a different valence electron number from Si. Hence, it is considered that the addition of Al can effectively improve the charge and discharge cycle durability from this point of view as well.

In other words, it is particularly preferable that $60 \leq x \leq 69$, $1.5 \leq y \leq 8$, $28 \leq z \leq 31$, and $0.3 \leq w \leq 3$ in the present embodiment (the case in which w>0). It is easy to achieve the microtextural structure of the silicon-containing alloy according to the present embodiment by containing Ti in a relatively large amount and Sn and Al in certain amounts while containing Si as a main component in this manner.

However, the numerical ranges of the constituent ratios of the respective constitutional elements described above are merely illustrative of preferred embodiments and are within the technical scope of the present invention as long as they are included in the claims.

Incidentally, as described above, A is impurities (unavoidable impurities) derived from raw materials and the production method other than the three components (or four components) described above. a is preferably $0 \leq a < 0.5$ and more preferably $0 \leq a < 0.1$. It is possible to confirm whether the negative electrode active material (silicon-containing alloy) has the composition represented by Chemical Formula (I) above or not through qualitative analysis by X-ray fluorometry (XRF) and quantitative analysis by inductively coupled plasma (ICP) emission spectrometry.

<Microtextural Structure of Silicon-Containing Alloy>

As described above, the silicon-containing alloy constituting the negative electrode active material in the present embodiment is also characterized by having a structure in which the a-Si phase is dispersed in the silicide phase. In other words, it is one of the features of the silicon-containing alloy according to the present embodiment to have a so-called sea-island structure in which islands composed of the a-Si phase as a dispersed phase are dispersed in the sea composed of the silicide phase as a continuous phase. Incidentally, it is possible to confirm whether the silicon-containing alloy has such a microtextural structure or not by observing the silicon-containing alloy by using a high angle annular dark field scanning transmission electron microscope (HAADF-STEM) and then conducting element intensity mapping by energy dispersive X-ray spectroscopy (EDX) for the same visual field as the observation image, for example, as will be described in the section of Examples later.

<a-Si Phase>

Here, in the silicon-containing alloy according to the present embodiment, the a-Si phase is a phase containing amorphous or low-crystalline silicon in which tin (and also aluminum in the case of a quaternary alloy) is present in the crystal structure of silicon in the form of a solid solution. This a-Si phase is a phase involved in occlusion and release of lithium ions at the time of operation of the electric device (lithium ion secondary battery) of the present embodiment and is a phase which can electrochemically react with lithium (that is, can occlude and release a large amount of lithium per unit weight and unit volume). In addition, tin (and also aluminum in the case of a quaternary alloy) is present in the crystal structure of silicon constituting the a-Si phase in the form of a solid solution, but trace amounts of additive elements such as phosphorus and boron, a transition metal, and the like may be contained in the parent phase since silicon exhibits poor electron conductivity. The size of the a-Si phase is not particularly limited, but from the viewpoint of decreasing the dimensional change of the a-Si phase at the time of charge (when intercalating Li ions into the microstructure) and at the time of discharge (when deintercalating Li ions from the microstructure), it is more preferable as the size of the a-Si phase is smaller, and specifically the size is preferably 10 nm or less and more preferably 8 nm or less. Meanwhile, the lower limit value of the size of the a-Si phase is also not particularly limited, but it is preferably 5 nm or more. Incidentally, the value of the diameter of the a-Si phase can be obtained as an arithmetic mean value of the measured values obtained by measuring the diameter of five or more phases by a method in which EDX element mapping of Si at a high magnification (25 nm scale bar) is compared with EDX element mapping of M (for example, Ti) by HAADF-STEM, the region in which Si is present but M is not present is regarded as the Si phase, the intensity to be 1/10 of the maximum value in EDX element mapping of M is taken as a threshold value, the region to be equal to or smaller than this threshold value is subjected to binarization image processing, and the dimensions of the respective Si phases are read from the binarized image thus obtained. In the same manner, the value of the diameter of the silicide phase to be described later can be obtained as the arithmetic mean value of the measured values obtained by measuring the diameters of five or more phases by a method in which EDX element mapping of Si at a high magnification (25 nm scale bar) is compared with EDX element mapping of M (for example, Ti) by Cs-STEM, the region in which Si is present and M is also present is regarded as the silicide phase, the intensity to be $\frac{1}{10}$ of the maximum value in EDX element mapping of M is taken as a threshold value, the region to be equal to or greater than this threshold value is subjected to binarization image processing, and the dimensions of the respective silicide phases are read from the binarized image thus obtained.

It is preferable that this a-Si phase is amorphized more than the silicide phase to be described later. By employing such a configuration, the negative electrode active material (silicon-containing alloy) can be formed to have a higher capacity. Incidentally, it is possible to judge whether the a-Si phase is amorphized more than the silicide phase or not from a diffraction pattern acquired by subjecting each of the observation images of the a-Si phase and the silicide phase by a high angle annular dark field scanning transmission electron microscope (HAADF-STEM) to fast Fourier transformation (FFT). In other words, the diffraction pattern shown in this diffraction pattern shows a net pattern (lattice-shaped spot) of a two-dimensional point array for a single crystal phase, a Debye-Scherrer ring (diffraction ring) for a polycrystalline phase, and a halo pattern for an amorphous phase. The above confirmation can be conducted by utilizing this. In the present embodiment, the a-Si phase may be amorphous or low crystalline, but it is preferable that the a-Si phase is amorphous from the viewpoint of realizing higher cycle durability.

Incidentally, the silicon-containing alloy according to the present embodiment essentially contains tin, but tin is present not in the silicide phase but in the a-Si phase since tin is an element which does not form a silicide with silicon. Moreover, all the tin elements are present in the crystal structure of silicon in the form of a solid solution in the a-Si phase in a case when the content of tin is low. Meanwhile, when the content of tin is increased, the tin elements which cannot be present in silicon in the form of a solid solution in the a-Si phase aggregate and are present as a crystal phase of tin simple substance. In the present embodiment, it is preferable that such a crystal phase of tin simple substance is not present. In the same manner, in a case when the silicon-containing alloy is a quaternary alloy, the alloy essentially contains Al. However, aluminum is also present not in the silicide phase but in the a-Si phase since aluminum is also an element which does not form a silicide with silicon, and all the aluminum elements are present in the crystal structure of silicon in the form of a solid solution in the a-Si phase in a case when the content of aluminum is low. In a case when the silicon-containing alloy is a quaternary alloy, it is preferable that a crystal phase of aluminum simple substance is also not present.

In addition, in a preferred embodiment of the present invention, a preferred range of the size of the periodic array region (MRO) for the a-Si phase is regulated. Here, the size of the periodic array region (MRO) in the a-Si phase is measured by the following TEM-MRO analysis (the same measurement is also conducted in the Examples to be described later).

(Measurement of Size of Periodic Array Region (MRO) in a-Si Phase by TEM-MRO Analysis)

In the present measurement, a diffraction pattern is acquired through Fourier transform processing for the lattice image of the silicon-containing alloy obtained by using a high angle annular dark field scanning transmission electron microscope (HAADF-STEM). It is possible to measure the size of the periodic array region (MRO) from the Fourier transform image acquired by subjecting a diffraction ring portion present in a width of from 0.7 to 1.0 when the distance between Si regular tetrahedrons is set as 1.0 in this diffraction pattern to inverse Fourier transform processing by focusing on the periodic array.

Lattice Image by HAADF-STEM Observation

Here, the observation using a high angle annular dark field scanning transmission electron microscope (HAADF-STEM) can be usually conducted by using HAADF-STEM and a computer. As the observation by HAADF-STEM, it is possible to utilize a technique in which an electron beam is applied to the sample to be observed and the lattice image (interference image) produced by the electrons transmitted through the sample to be observed is enlarged and observed (monitored) by a computer. According to a transmission electron microscope (TEM), it is possible to acquire an observation image which is enlarged to an atomic level and have a high resolution and a high contrast. FIG. 6(A) is, for example, an enlarged photograph of a lattice image of the silicon-containing alloy of the present embodiment (more specifically, one fabricated in Example 1-1) obtained by HAADF-STEM.

Next, the lattice image obtained by using HAADF-STEM is subjected to Fourier transform processing to obtain a diffraction pattern. The Fourier transform processing can be conducted, for example, by a software "Digital Micrograph" developed by Gatan, Inc. Incidentally, for Fourier transform processing of the lattice image obtained by HAADF-STEM, other general-purpose software that can be easily reproduced (implemented) by those skilled in the art may be used. In the HAADF-STEM image illustrated in FIG. 6(A), there are a bright portion and a dark portion. The bright portion corresponds to the portion at which an atomic row is present and the dark portion corresponds to the portion between an atomic row and another atomic row.

Diffraction Pattern

Subsequently, a portion (the portion enclosed by a broken line frame) in 40 nm on every side of the lattice image (HAADF-STEM image) illustrated in FIG. 6(A) is subjected to fast Fourier transform (FT) processing. Here, a diffraction pattern (diffraction data) including a plurality of diffraction spots corresponding to a plurality of atomic planes is acquired by subjecting the scope enclosed by a broken line frame of the acquired lattice image to Fourier transform processing. This Fourier transform processing can be conducted, for example, by a software "Digital Micrograph" developed by Gatan, Inc. Incidentally, for this Fourier transform processing, other general-purpose software that can be easily reproduced (implemented) by those skilled in the art may be used.

FIG. 6(B) is a photograph which illustrates a diffraction pattern acquired by subjecting lattice image (HAADF-STEM image) of the silicon-containing alloy of Example 1-1 illustrated in FIG. 6(A) to fast Fourier transformation (FFT) processing. In the diffraction pattern illustrated in FIG. 6(B), as the intensity indicating the absolute value, a plurality of diffraction ring portions (diffraction spots) are observed in a ring shape (annular shape) around the brightest spot seen at the center.

In the diffraction pattern illustrated in FIG. 6(B), the diffraction ring portion present in a width of from 0.7 to 1.0 when the distance between Si regular tetrahedrons is 1.0 is determined. Here, the distance between Si regular tetrahedrons corresponds to the distance (also simply referred to as the distance between Si and Si) between the central Si atom of an Si tetrahedral structure and the central Si atom of another Si regular tetrahedral structure. Incidentally, this distance corresponds to the interplanar spacing of the Si (220) plane in the Si diamond structure. From this, in this step S13, the diffraction ring portion corresponding to the Si (220) plane among the plurality of diffraction ring portions (diffraction spots) is assigned, and this diffraction ring portion is regarded as the diffraction ring portion present in a width of from 0.7 to 1.0 when the distance between Si regular tetrahedrons is 1.0. For the assignment of the diffraction ring portion (diffraction line), for example, it is possible to use known literatures (official dispatches, academic books, and the like) and literatures on various kinds of electron diffraction lines of silicon open to the public on the internet. For example, it is possible to conduct the assignment with reference to the literatures on the electron diffraction lines of silicon such as Nagoya University Graduate School of Engineering and Faculty of Engineering "Technical Review", Vol. 9, March 2007, I. Technical workshop of engineering department 8. Acquisition of technology on electron diffraction pattern observation through transmission electron microscope, SAITO Noriyuki, ARAI Shigeo, Graduate School of Engineering and Faculty of Engineering and Technology, Department of Materials and Analysis Technology (http://etech.engg.nagoya-u.ac.jp/gihou/v9/047.pdf) open to the public on the internet.

(Inverse Fourier Transform Image)

Subsequently, the diffraction ring portion present in a width of from 0.7 to 1.0 when the distance between Si regular tetrahedrons of the diffraction pattern is set as 1.0, namely, the diffraction ring portion corresponding to the Si (220) plane is subjected to inverse Fourier transform processing. An inverse Fourier transform data is acquired by subjecting (the extracted pattern and extracted data obtained by extracting data of) this diffraction ring portion corresponding to this Si (220) plane to inverse Fourier transform processing. The inverse Fourier transform processing can be conducted, for example, by a software "Digital Micrograph" developed by Gatan, Inc. Incidentally, for this inverse Fourier transform processing, other general-purpose software that can be easily reproduced (implemented) by those skilled in the art may be used.

FIG. 6(C) is a photograph which illustrates an inverse Fourier transform image acquired by subjecting the extracted pattern from which the data of the diffraction ring portion corresponding to the Si (220) plane in FIG. 6(B) is extracted to inverse fast Fourier transformation processing. As illustrated in FIG. 6(C), a bright and dark design composed of a plurality of bright portions (bright portions) and a plurality of dark portions (dark portions) is observed on the inverse Fourier transform image thus obtained. Most of the bright portions and dark portions are amorphous regions (amorphous Si regions) which are irregularly disposed without being periodically arranged. However, as illustrated in FIG. 6(C), a region in which bright portions are periodically arranged (periodic array portion present in an ellipse enclosed by a broken line in FIG. 6(C)) is disseminated (scattered). That is, in the amorphous region other than the periodic array portion present in the ellipse enclosed by a broken line in the inverse Fourier transform image illustrated in FIG. 6(C), a bright portion and a dark portion are not linearly stretched but bent in the middle and are not also regularly arranged side by side. In addition, there is also a portion at which the brightness contrast between a bright portion and a dark portion is weakened. Such a structure of the bright and dark design composed of a bright portion and a dark portion in the amorphous region other than the periodic array portion present in the ellipse enclosed by a broken line indicates that the sample to be observed has an amorphous or microcrystalline (precursor of MRO) structure in the amorphous region. Accordingly, it is possible to easily analyze whether there is a region (crystallized region or crystalline structure region) having a periodic array present in the ellipse enclosed by a broken line in the amorphous region or not by acquiring an inverse Fourier transform image as shown in FIG. 6(C). The "region having a periodic array" is also referred to as "periodic array region (Middle Range Order; MRO)".

In the present aspect, the "periodic array region (MRO)" means a region in which at least two or more rows of at least three bright portions that are continuously disposed in an approximately straight line are regularly disposed side by side. It is indicated that the sample to be observed has a crystalline structure in this periodic array region (MRO). That is, the "periodic array region (MRO)" indicates a crystallized (crystalline structure) region disseminated (scattered) in the amorphous Si region occupying the greater part of the Fourier image.

Figure 7:
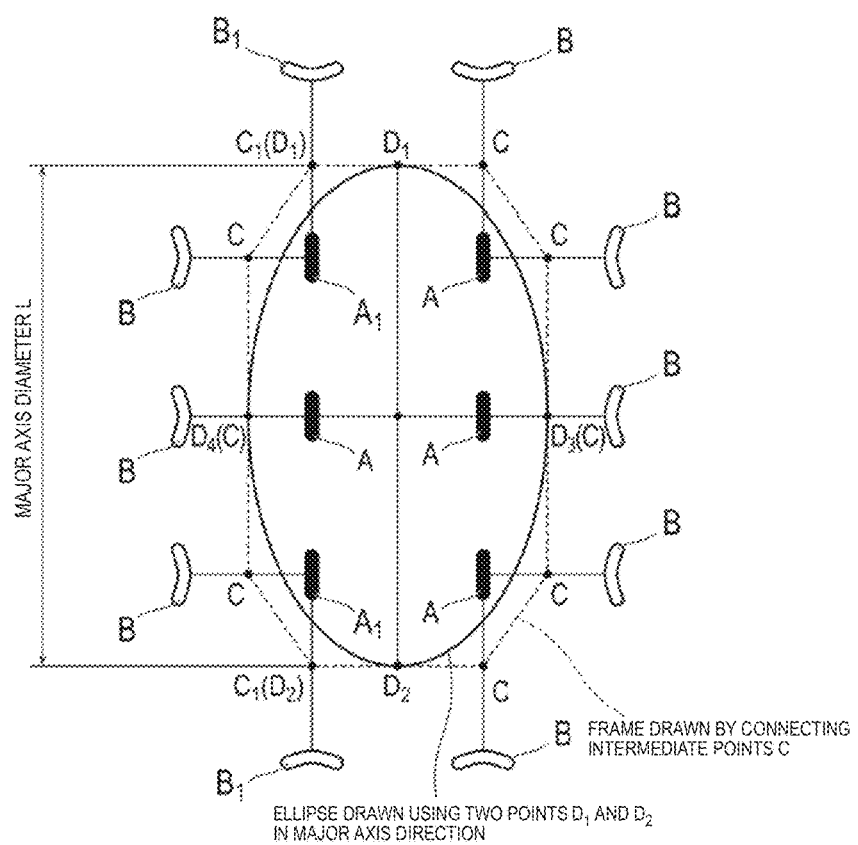
FIG. 7 is a view which schematically illustrates the "major axis diameter of the periodic array region (MRO)".

In addition, FIG. 7 is a view which schematically illustrates the "major axis diameter of the periodic array region (MRO)". In FIG. 7, dark portion A (the bright portion in FIG. 6(C)) of the periodic array region (MRO) is denoted by a black circle ● and the dark portion B (the bright portion in FIG. 6(C)) of the region (amorphous Si region) that is adjacent to the region having a periodic array and irregularly disposed is denoted by a white circle ○ for the sake of convenience. In addition, in FIG. 7, the "periodic array region (MRO)" is described by using a region in which two rows of three dark portions (bright portions in FIG. 6(C)) that are continuously disposed in a straight line are adjacently disposed in parallel. In the present aspect, the "major axis diameter of the periodic array region (MRO)" can be determined as follows. First, as illustrated in FIG. 7, intermediate points C of the shortest route connecting the dark portions A (●) in the "periodic array regions" and the dark portions B (○) that are adjacent to these and in the irregularly disposed regions are taken. Four points D1 to D4 in the major axis direction and the minor axis direction are selected from the one-dotted broken line frame (which may not match the elliptic equation) drawn by connecting these intermediate points C, and at least two points (preferably all of the four points) in the major axis direction among these can be used in order to determine the major axis diameter (L) of the ellipse drawn by the elliptic equation (the ellipse enclosed by a broken line in FIG. 6(C); a software for drawing an ellipse which can draw a diagram on the image can be used). For example, as illustrated in FIG. 7, the length of the dark portion $A_1$ (●) at both ends to be the longest in the major axis direction of the "periodic array region (MRO)" is measured by using image analysis software capable of measuring the distance between two points (for example, data of major axis diameter by a software for drawing an ellipse). Next, the length of the dark portions $B_1$ (○) in the irregularly disposed region and adjacent to the dark portions $A_1$ (●) at both ends in the major axis direction of the "periodic array region (MRO)" is measured in the same manner. From these, the length of the intermediate points $C_1$ at both ends connecting the dark portions $A_1$ (●) at both ends in the major axis direction of the "periodic array region (MRO)" and the dark portions $B_1$ (●) in the irregularly disposed region and adjacent to this is determined, and this length can be adopted as the major axis diameter (L).

Incidentally, the ellipse enclosed by the broken line in FIG. 6(C) is an ellipse drawn (by using a software for drawing an ellipse which can draw a diagram on the image) by an elliptic equation by taking two points in the major axis direction as the major axis diameter and two points in the minor axis direction as the minor axis diameter so as to include all the regions having a periodic array as illustrated in FIG. 7.

In addition, in the present aspect, the "size determined as the average value of maximum five major axis diameters" refers to the magnitude (size) of the average value determined as follows. A "periodic array region (MRO)" in an inverse Fourier transform image is specified, and the major axis diameter of a plurality of "periocid array regions (MRO)" thus obtained is determined from the ellipse drawn according to the definition of the "major axis diameter of a periodic array region (MRO)" described above. Five major axis diameters are determined in the order of larger value from among the plurality of major axis diameters thus obtained, and the average value thereof is determined as the size of the periodic array region (MRO). Incidentally, the reason for that "maximum five major axis diameters" are taken is because there is also a case in which the "major axis diameters of the periodic array regions" obtained from an inverse Fourier transform image (in the visual field of 40×40 nm; see FIG. 6(C)) do not satisfy five (four or fewer). In this case, the average value of all the major axis diameters of the "periodic array regions" obtained from the inverse Fourier transform image is calculated and the magnitude (size) of the average value is determined as the size of the periodic array region (MRO). Incidentally, in the present aspect, it is sufficient that a plurality of (two or more) "periodic array regions (MRO)" are present in an inverse Fourier transform image (in the visual field of 40×40 nm), but three or more regions are preferable, four or more regions are more preferable, and five or more regions are still more preferable. In addition, the upper limit of the number of the "periodic array region (MRO)" in an inverse Fourier transform image (in the visual field of 40×40 nm) may be in a range in which the amorphous Si characteristics (action and effect) is not impaired, and 10 or fewer are preferable.

(Size of Periodic Array Region)

In a preferred embodiment of the present invention, the size of periodic array region is preferably 3.2 nm or less, and more preferably 1.6 nm or less. As the size of periodic array region (MRO) satisfies the above range (requirement), Si is sufficiently amorphized and it is thus possible to alleviate the expansion of Si particles at the time of charge and discharge and to provide an Si alloy active material capable of greatly improving the durability. That is, it is possible to express (confirm) the diffraction ring portion of the Si (220) plane which is required to obtain an Si alloy having high durability performance as Si is converted to a sufficiently amorphized state. In addition, from the inverse Fourier transform image of the diffraction ring portion of the Si (220) plane, the degree of amorphization increases and an irreversible Li—Si alloy crystal phase is hardly formed when amorphous Si is used as an active material as a MRO (crystallized Si region) exhibiting regularity is formed in the amorphous phase and the size of this MRO is decreased. Furthermore, it is possible to alleviate the expansion of active material particles at the time of charge and discharge and to greatly improve the durability as the degree of amorphization increases. Incidentally, the lower limit of the size of periodic array region is not particularly limited, but it may be 1 nm or more from the theoretical point of view.

In addition, in another preferred embodiment of the present invention, a preferred range of the distance between Si regular tetrahedrons in the a-Si phase is also defined. Here, the value of the distance between Si regular tetrahedrons in the a-Si phase can also be measured by the TEM-MRO analysis for the measurement of the periodic array region (MRO) described above (the same measurement is also conducted in Examples to be described later). Specifically, first, an arbitrary region, for example, of 20 nm square (visual field of 20×20 nm) is secured (selected) in the region (amorphous region) which does not include the periodic array region (MRO) present in the ellipse enclosed by a broken line of the inverse Fourier transform image as illustrated in FIG. 6(C) described above, and the number of bright portions (dots=corresponding to Si tetrahedral units) in this visual field region is measured. Next, a value obtained by dividing 20 nm which is the length of one side of the visual field by the square root of the number of bright portions is taken as the distance between Si regular tetrahedrons. For example, 20 nm÷√(100)=20 nm/10=2 nm is the distance between Si regular tetrahedrons when the number of bright portions (dots=corresponding to Si regular tetrahedral units) in an arbitrary visual field region of 20 nm square is 100.

(Distance between Si Regular Tetrahedrons)

In a preferred embodiment of the present invention, the distance between Si regular tetrahedrons in the amorphous region is preferably greater than 0.36 nm, more preferably 0.40 nm or more, still more preferably 0.44 nm or more, and particularly preferably 0.48 nm or more. The amorphization of the amorphous region can proceed as the distance between Si regular tetrahedrons in the amorphous region satisfies the above range. As a result, Li ions can be easily intercalated/deintercalated between the expanded Si—Si at the time of charge and discharge. It is possible to greatly improve the durability of a negative electrode and an electric device which use the negative electrode active material of the present aspect. Incidentally, the upper limit value of the distance between Si regular tetrahedrons in the amorphous region is not particularly limited, but it can be said to be 0.55 nm or less from a theoretical point of view.

<Silicide Phase>

Meanwhile, the silicide phase constituting the sea (continuous phase) of the sea-island structure described above is a crystal phase containing a silicide (silicide) of a transition metal as a main component. This silicide phase contains a silicide of a transition metal (for example, $TiSi_2$) so as to exhibit excellent affinity for the a-Si phase and to be able to suppress cracking at the crystal interface particularly due to volume expansion at the time of charge. Furthermore, the silicide phase is superior to the a-Si phase in electron conductivity and hardness. In this manner, the silicide phase improves low electron conductivity of the a-Si phase and also plays a role of maintaining the shape of the active material against the stress at the time of expansion. In the present embodiment, it is considered that it is possible to further improve the electron conductivity of the negative electrode active material (silicon-containing alloy) and to prevent cracking of the active material by relaxing the stress at the time of expansion of the a-Si phase and the silicide phase contributes to the improvement in cycle durability as the silicide phase having such characteristics constitutes the sea (continuous phase) of a sea-island structure.

A plurality of phases may be present in the silicide phase, and, for example, two or more phases having different composition ratios of the transition metal element M to Si (for example, $MSi_2$ and MSi) may be present. In addition, two or more phases may be present by containing silicides of different transition metal elements. Here, the kind of the transition metal (M) contained in the silicide phase is not particularly limited, but it is preferably at least one kind selected from the group consisting of Ti, Zr, Ni, Cu, and Fe, more preferably Ti or Zr, and particularly preferably Ti. The silicides formed of these elements have a higher electron conductivity than silicides of other elements and a high strength. In particular, $TiSi_2$, a kind of silicides when the transition metal element is Ti, is preferable since it exhibits significantly excellent electron conductivity. In view of such a property of the silicide and the excellent property of amorphous Si mentioned above, it is preferable that the silicide of a transition metal is $TiSi_2$ and the a-Si phase is amorphous.

Particularly, in a case when the transition metal element M is Ti and two or more phases (for example, $TiSi_2$ and TiSi) having different composition ratios are present in the silicide phase, a $TiSi_2$ phase is 50% by mass or more, preferably 80% by mass or more, more preferably 90% by mass or more, particularly preferably 95% by mass or more, and most preferably 100% by mass of the silicide phase.

The size of the silicide phase is not particularly limited, but the size of the silicide phase is 50 nm or less, more preferably 30 nm or less, and still more preferably 25 nm or less in a preferred embodiment. By employing such a configuration, the negative electrode active material (silicon-containing alloy) can be formed to have a higher capacity. Meanwhile, the lower limit value of the size of the silicide phase is also not particularly limited, but it is preferable that the diameter of the silicide phase is larger than the diameter of the a-Si phase described above from the viewpoint of suppressing the expansion and contraction of the a-Si phase accompanying intercalation and deintercalation of Li ions, and the absolute value thereof is preferably 10 nm or more and more preferably 15 nm or more.

Furthermore, according to the investigations of the present inventors, in a preferred embodiment of the present invention, it has been demonstrated that even superior cycle durability can be realized when the mass ratio of the silicide phase to the available-Si phase which is a Si phase and can function as an active material is within a predetermined range. Specifically, first, the value of the ratio ($m_2/m_1$) of the mass ($m_2$) of the silicide phase to the mass ($m_1$) of the available-Si phase in the silicon-containing alloy is preferably from 1.78 to 2.63 and more preferably 1.97 to 2.20 when the silicon-containing alloy is a ternary alloy (that is, when w=0).

In the same manner, the value of the ratio ($m_2/m_1$) of the mass ($m_2$) of the silicide phase to the mass ($m_1$) of the available-Si phase in the silicon-containing alloy is preferably from 1.76 to 2.00 when the silicon-containing alloy is a quaternary alloy (that is, when w>0). Here, in this embodiment, the mass ratio of the available-Si phase in the silicon-containing alloy is also not particularly limited, but the ratio of the mass ($m_1$) of the available-Si phase to 100% by mass of the silicon-containing alloy is preferably 24% by mass or more and more preferably from 29% to 36% by mass from the viewpoint of securing a sufficient capacity while exerting the characteristics of the other constitutional elements. According to the embodiment in which the silicon-containing alloy is a quaternary alloy (that is, w>0), it is possible to decrease mass ratios of tin and aluminum even in a case when the total number of atoms (atomic moles) of these is constant by substituting a part of tin (atomic weight=118.7) with aluminum (atomic weight=26.98). As a result, it is possible to increase the capacity of the negative electrode active material containing the silicon-containing alloy while maintaining the value of $m_2/m_1$ relatively high. In addition, aluminum can also greatly contribute to the cost reduction of the negative electrode active material since it is extremely inexpensive as compared with tin.

In addition, from the same point of view, it is preferable to satisfy $m_1 \geq 61 - 14.3 \times (m_2/m_1)$ where $m_1$ and $m_2$ denote the mass of the available-Si phase and the mass of the silicide phase in the silicon-containing alloy, respectively. Incidentally, the mass ($m_1$) of the available-Si phase and the mass ($m_2$) of the silicide phase in the silicon-containing alloy for calculating the value of $m_2/m_1$ are the theoretical values calculated by the following equation by converting the percent by mass of the constitutional metal element in the alloy composition to atomic percent and assuming that all Ti elements form $TiSi_2$, and the amount of available-Si and the amount of $TiSi_2$ are calculated by this method in Examples to be described later as well.

Amount of available-Si (% by mass)=(at % of Si)−[at % of Ti]×2)×28.0855 (atomic weight of Si)/{([at % of Si]−[at % of Ti]×2)×28.0855 (atomic weight of Si)+[at % of Sn]× 118.71 (atomic weight of Sn)+[at % of Ti]×104.038 (formula weight of $TiSi_2$)}

Here, when the amount of available-Si is calculated using a $Si_{65}Sn_5Ti_{30}$ alloy as an example, the amount of available-Si (% by mass) is calculated to be 29.8% by mass since at % of Si of the alloy is 77.58 at % and at % of Ti of the alloy is 21.01 at %.

In the same manner, the amount of silicide ($TiSi_2$) is calculated by $TiSi_2$ amount (% by mass)=([at % of Ti]× 104.038 (formula weight of $TiSi_2$))/{([at % of Si]−[at % of Ti]×2)×28.0855 (atomic weight of Si)+[at % of Sn]×118.71 (atomic weight of Sn)+[at % of Ti]×104.038 (formula weight of $TiSi_2$)}. Here as well, when the amount of silicide ($TiSi_2$) is calculated using a $Si_{65}Sn_5Ti_{30}$ alloy as an example, the amount of $TiSi_2$ (% by mass) is calculated to be 65.2% by mass since at % of Si of the alloy is 77.58 at % and at % of Ti of the alloy is 21.01 at %.

The particle diameter of the silicon-containing alloy constituting the negative electrode active material in the present embodiment is not particularly limited, but it is preferably from 0.1 to 20 μm and more preferably from 0.2 to 10 μm as an average particle diameter. Incidentally, in the present specification, the "average particle diameter" means the particle diameter (D50) at an integrated value of 50% in the particle size distribution measured by the laser diffraction scattering method.

(Method of Producing Negative Electrode Active Material)

The method of producing a negative electrode active material for electric device according to the present embodiment is not particularly limited, and conventionally known knowledge can be appropriately referred to, but in the present application, a production method in which the fabrication of a quenched thin strip by a liquid quenching solidification method and a mechanical alloying treatment are concurrently used as follows is provided as an example of a method of producing a negative electrode active material containing a silicon-containing alloy having a structure in which an a-Si phase containing amorphous or low crystalline silicon containing tin (and also aluminum in a quaternary alloy) in the silicon crystal structure in the form of a solid solution is dispersed in a silicide phase containing a silicide of a transition metal as a main component. In other words, according to another aspect of the present invention, there is also provided a method of producing a negative electrode active material for electric device containing a silicon-containing alloy having a composition represented by Chemical Formula (I) above, which includes fabricating a quenched thin strip from a parent alloy having the same composition as that of the silicon-containing alloy by a liquid quenching solidification method and subjecting the quenched thin strip to a mechanical alloying treatment to obtain the negative electrode active material for electric device containing a silicon-containing alloy. It is possible to produce an alloy having the microtextural structure described above by producing a negative electrode active material (silicon-containing alloy) by conducting the liquid quenching solidification method before the mechanical alloying treatment in this manner. In addition, there is provided a production method which can effectively contribute to the improvement in cycle durability of the negative electrode active material so that it is possible to increase the distance between Si regular tetrahedrons in the alloy to be obtained and to decrease the size of the periodic array region (MRO). Hereinafter, the production method according to the present aspect will be described step by step.

<Liquid Quenching Solidification Method>

First, a liquid quenching solidification method is conducted by using a parent alloy having the same composition as that of the desired silicon-containing alloy. A quenched thin strip is fabricated by this.

Here, in order to obtain the parent alloy, high-purity raw materials (simple substance ingots, wires, plates, and the like) are prepared for each of silicon (Si), tin (Sn), and the transition metal (for example, titanium (Ti)). Subsequently, a parent alloy in the form of an ingot or the like is fabricated by a known method such as an arc melting method in consideration of the composition of the silicon-containing alloy (negative electrode active material) to be finally produced.

Thereafter, a liquid quenching solidification method is conducted by using the parent alloy obtained above. This step is a step of quenching and solidifying the melt obtained by melting the parent alloy obtained above and can be conducted by, for example, a high frequency induction melting-liquid quenching solidification method (twin roll or single roll quenching method). A quenched thin strip (ribbon) is obtained by this. In addition, the liquid quenching solidification method is often used as a method of fabricating an amorphous alloy, and there are a great number of findings on the method itself. Incidentally, the liquid quenching solidification method can be conducted by using a commercially available liquid quenching solidification apparatus (for example, liquid quenching solidification apparatus NEV-A05 manufactured by NISSIN GIKEN Corporation). At this time, the spraying pressure is preferably set to about from 0.03 to 0.09 MPa as a gauge pressure, the internal pressure of vacuum chamber is set to from −0.03 to −0.07 MPa (0.03 to 0.05 MPa as an absolute pressure) as a gauge pressure, the pressure difference between the internal pressure of the chamber and the spraying pressure is thus preferably set to from 0.06 to 0.16 MPa, and the number of revolutions of roll is preferably set to from 4000 to 6000 rpm (40 to 65 m/sec as a circumferential speed).

Incidentally, titanium disilicide ($TiSi_2$) has two kinds of crystal structures of a C49 structure and a C54 structure. The C49 structure is a phase (metastable phase) having a high resistivity of about 60 $\mu\Omega\cdot cm$ and is a base-centered orthorhombic structure. Meanwhile, the C54 structure is a phase (stable phase) having a low resistivity of about from 15 to 20 $\mu\Omega\cdot cm$ and is a face-centered orthorhombic structure. Here, as will be described with reference to FIG. 8 in the section of Examples later, it has been demonstrated that the quenched thin strip obtained by the liquid quenching solidification method has a microtextural structure in which a texture which is composed of a disilicide ($TiSi_2$) and considered as a primary crystal texture and a eutectic texture of the silicide and an a-Si phase are present together. In addition, it has been confirmed that the crystal structure of a disilicide ($TiSi_2$) contained in the quenched thin strip obtained by the liquid quenching solidification method is the C49 structure from the diffraction pattern acquired by subjecting the respective portions (primary silicide phase, eutectic a-Si phase, and eutectic silicide phase) in the observation image to fast Fourier transformation processing. It is considered that the silicide phase is sufficiently destroyed and likely to be dispersed in the alloy to be finally obtained even without being subjected to a mechanical alloying treatment for a long time when a negative electrode active material (silicon-containing alloy) is produced by subjecting this quenched thin strip to a mechanical alloying treatment since a disilicide ($TiSi_2$) having a C49 structure has a lower hardness than that having a C54 structure. It can be said that the production method according to the present aspect is also advantageous from the viewpoint of being able to effectively utilize the property of a low hardness of the silicide phase which is contained in the quenched thin strip obtained by the liquid quenching solidification method and has a C49 structure in this manner. Incidentally, it has also been confirmed that the disilicide ($TiSi_2$) contained in the negative electrode active material (silicon-containing alloy) obtained by conducting a mechanical alloying treatment has a C54 structure although the data are not shown. It can be said that the negative electrode active material has a more preferred crystal structure as a negative electrode active material since a C54 structure has a lower resistivity (higher electron conductivity) than a C49 structure as described above.

<Mechanical Alloying Treatment>

Subsequently, a mechanical alloying treatment is conducted by using the quenched thin strip obtained above. Here, it is preferable to carry out a step of crushing the quenched thin strip obtained above and to subject the crushed material thus obtained to the mechanical alloying treatment if necessary.

In the mechanical alloying treatment, alloying can be attained by putting crushing balls and raw material powders of the alloy in the crushing pot and increasing the number of revolutions of the apparatus to apply high energy to the raw material powders by using a ball mill apparatus (for example, a planetary ball mill apparatus) as used in Examples to be described later since it is possible to easily control the state of the phase by conducting the alloying treatment by the mechanical alloying treatment. In the alloying treatment, the raw material powders can be alloyed as high energy is applied thereto by increasing the number of revolutions of the apparatus. In other words, heat is generated by the application of high energy, thus the raw material powders are alloyed, and amorphization of the a-Si phase, formation of a solid solution by tin in the phase, and formation of the silicide phase proceed. It is possible to decrease the size of the periodic array region (MRO) in the amorphous region and to increase the distance between Si regular tetrahedrons in the amorphous region by increasing (500 rpm or more and preferably 600 rpm or more in the case of the apparatus used in Examples) the number of revolutions (applied energy) of the apparatus to be used in the alloying treatment. In addition, it is possible to obtain a silicon-containing alloy having a suitable microtextural structure as the time for conducting the mechanical alloying treatment is increased. The time for the mechanical alloying treatment is preferably 12 hours or longer, more preferably 24 hours or longer, still more preferably 30 hours or longer, yet more preferably 36 hours or longer, particularly preferably 42 hours or longer, and most preferably 48 hours or longer from such a viewpoint. Incidentally, the upper limit value of the time for the alloying treatment is not particularly set, but it may be usually 72 hours or shorter.

In the present aspect, the energy applied to the silicon-containing alloy is changed by changing the number of revolutions of the apparatus to be used, the number of crushing balls, and the amount of the sample (raw material powders of the alloy) filled as well as the time for the alloying treatment, and it is thus possible to control the size of the periodic array region (MRO) and the distance between Si regular tetrahedrons in the amorphous region. The mechanical alloying treatment by the method described above is usually conducted in a dry atmosphere, but the particle size distribution after the mechanical alloying treatment has a wide width from a small size to a large size in some cases. For this reason, it is preferable to conduct a crushing treatment and/or a classification treatment to adjust the particle size.

In addition, in the present application, a production method in which the alloying treatment is conducted by a mechanical alloying treatment using a ball mill apparatus having ability to apply high energy is also provided as another example of a method of producing a negative electrode active material containing a silicon-containing alloy having a predetermined structure as described above. In other words, according to another aspect of the present invention, there is also provided a method of producing a negative electrode active material for electric device containing a silicon-containing alloy having a composition represented by Chemical Formula (I) above, in which a negative electrode active material for electric device containing the silicon-containing alloy is obtained by subjecting the powder of a parent alloy having the same composition as that of the silicon-containing alloy to a mechanical alloying treatment using a ball mill apparatus which applies a centrifugal force of 20 [G] or more.

The production method according to the present aspect is characterized in that the centrifugal force to be applied to the materials by the ball mill apparatus to be used for the mechanical alloying treatment is 20 [G] or more. By conducting the mechanical alloying treatment by using a ball mill apparatus which applies a relatively great centrifugal force in this manner, it is possible to produce a silicon-containing alloy (negative electrode active material) which is subjected to the alloying treatment for a shorter time but can exert cycle durability equal to or higher than that of a silicon-containing alloy subjected to the alloying treatment for a longer time by the action that the distance between Si regular tetrahedrons in the amorphous region (a-Si phase) can be increased. In addition, it is also possible to cut down the production cost of the silicon-containing alloy (negative electrode active material) since it is possible to decrease the used amount of Sn which is a relatively expensive raw material. Incidentally, the value of the centrifugal force is preferably 50 [G] or more, more preferably 100 [G] or more, still more preferably 120 [G] or more, particularly preferably 150 [G] or more, and most preferably 175 [G] or more. Meanwhile, the upper limit value of the centrifugal force is not particularly limited, but usually a value of about 200 [G] is realistic.

Here, the value of the centrifugal force to be applied to the materials in the ball mill apparatus is calculated by the following equation:

$$Gn1 = \left[ rs - \left\{ rp1 \cdot \left( \frac{rp1}{rs} \cdot (1+iw)^2 \right) \right\} \right] \cdot \frac{\left(2 \cdot \pi \cdot \frac{rpm}{60}\right)^2}{9.81} \quad \text{[Math. 1]}$$

In the above equation, Gn1 is the centrifugal force [G], rs is the revolution radius [m], rp1 is the rotation radius [m], iw is the ratio of rotation to revolution [-], rpm is the number of revolutions [revolutions/minute]. Hence, it is understood that the value of the centrifugal force Gn1 increases as the revolution radius rs increases, the rotation radius rp1 decreases, and the number of revolutions increases.

The specific configuration of the ball mill apparatus is not particularly limited, and conventionally known ball mill apparatuses such as a planetary ball mill apparatus and a stirring ball mill apparatus are used as long as the regulations on centrifugal force described above are satisfied. However, a stirring ball mill apparatus is preferably used in the production method according to the present aspect. This stirring ball mill apparatus includes a container having a cylindrical inner surface and a stirring blade provided in this container. In the container of this stirring ball mill apparatus, raw material powders, balls, a solvent, and a treating agent are put. Unlike a planetary ball mill apparatus, the container does not rotate but the stirring blade provided in the container rotates so that the raw material powders are alloyed. When such a stirring ball mill apparatus is used, it is possible to vigorously stir the materials in the container by the stirring blade and thus to apply a centrifugal force greater than that by other ball mill apparatuses to the materials in the container.

Incidentally, it is generally possible to obtain a silicon-containing alloy having a suitable microtextural structure as the time for conducting the mechanical alloying treatment is increased, but in the production method according to the present aspect, it is possible to realize the cycle durability equal to or higher than that of a silicon-containing alloy subjected to the alloying treatment for a longer time even when the time for the mechanical alloying treatment is decreased since the mechanical alloying treatment is conducted so as to apply a relatively great centrifugal force to the materials as described above. In the production method according to the present aspect, the time for the mechanical alloying treatment is preferably 45 hours or shorter, more preferably 30 hours or shorter, still more preferably 20 hours or shorter, yet more preferably 15 hours or shorter, particularly preferably 10 hours or shorter, and most preferably 5 hours or shorter from such a viewpoint. Incidentally, the lower limit value of the time for the mechanical alloying treatment is not particularly set, but it may be usually 0.5 hour or longer.

Incidentally, in the mechanical alloying treatment using a ball milling apparatus, it is possible to alloy the raw material powders by using a conventionally well-known ball but a titanium or zirconia ball having a diameter of 1 mm or less and particularly from 0.1 to 1 mm is preferably used as the ball. Particularly in the present aspect, a titanium ball manufactured by a plasma rotating electrode method is suitably used. Such a titanium or zirconia ball which has a diameter of 1 mm or less and is manufactured by a plasma rotating electrode method has a uniform spherical shape and is particularly preferable as a ball for obtaining a silicon-containing alloy.

In addition, in the present aspect, the solvent put in the container of the stirring ball mill is also not particularly limited. Examples of such a solvent may include water (particularly ion exchanged water), methanol, ethanol, propanol, butanol, pentanol, dimethyl ketone, diethyl ketone, diethyl ether, dimethyl ether, diphenyl ether, toluene, and xylene. These solvents are used singly or in appropriate combination.

Furthermore, in the present invention, the treating agent to be put in the container is also not particularly limited. Examples of such a treatment agent may include a surfactant and/or a fatty acid in addition to a carbon powder for preventing adhesion of the materials to the inner wall of the container.

The mechanical alloying treatment by the method described above is usually conducted in a dry atmosphere, but the particle size distribution after the mechanical alloying treatment has a wide width from a small size to a large size in some cases. For this reason, it is preferable to conduct a crushing treatment and/or a classification treatment to adjust the particle size.

The predetermined alloy to be essentially contained in the negative electrode active material layer has been described above, but the negative electrode active material layer may contain other negative electrode active materials. Examples of the negative electrode active material other than the predetermined alloy may include carbon such as natural graphite, artificial graphite, carbon black, activated carbon, carbon fiber, coke, soft carbon, and hard carbon, a pure metal such as Si or Sn, or an alloy-based active material having a composition ratio which deviates from the predetermined composition ratio described above, or a metal oxide such as TiO, $Ti_2O_3$, or $TiO_2$ or $SiO_2$, SiO, or $SiO_2$, a composite oxide (composite nitride) of lithium and a transition metal such as $Li_{4/3}Ti5/3O_4$ or $Li_7MnN$, Li—Pb alloy, Li—Al alloy, or Li. However, from the viewpoint of sufficiently exerting the action and effect obtained by using the predetermined alloy as the negative electrode active material, the content of the predetermined alloy in 100% by mass of the total amount of the negative electrode active material is preferably from 50 to 100% by mass, more preferably from 80 to 100% by mass, still more preferably from 90 to 100% by mass, particularly preferably from 95 to 100% by mass, and most preferably 100% by mass.

Subsequently, the negative electrode active material layer 13 contains a binder.

(Binder)

The binder is added for the purpose of binding the active materials with each other or the active material with the current collector and thus maintaining the electrode structure. The kind of the binder to be used in the negative electrode active material layer is also not particularly limited, and those described above as the binder to be used in the positive electrode active material layer can be used in the same manner. Hence, the detailed description thereon will be omitted here.

Incidentally, the amount of the binder contained in the negative electrode active material layer is not particularly limited as long as it is an amount in which the active material can be bound, but it is preferably from 0.5 to 20% by mass and more preferably from 1 to 15% by mass with respect to the negative electrode active material layer.

(Requirements Common to Positive Electrode and Negative Electrode Active Material Layers 15 and 13)

The requirements common to the positive electrode and negative electrode active material layers 15 and 13 will be described below.

The positive electrode active material layer 15 and the negative electrode active material layer 13 contain an electric conductive auxiliary, an electrolyte salt (lithium salt), an ion conductive polymer, and the like if necessary. In particular, the negative electrode active material layer 13 essentially contains an electric conductive auxiliary as well.

Electric Conductive Auxiliary

The electric conductive auxiliary is an additive to be blended in order to improve the electric conductivity of the positive electrode active material layer or the negative electrode active material layer. Examples of the electric conductive auxiliary may include carbon materials such as carbon black such as acetylene black, graphite, and vapor-grown carbon fiber. An electronic network which can contribute to improvement of output characteristics of the battery is effectively formed in the interior of the active material layer when the active material layer contains an electric conductive auxiliary.

The content of the electric conductive auxiliary to be mixed in the active material layer is in a range of 1% by mass or more, more preferably 3% by mass or more, and still more preferably 5% by mass or more with respect to the total amount of the active material layer. In addition, the content of the electric conductive auxiliary to be mixed in the active material layer is in a range of preferably 15% by mass or less, more preferably 10% by mass or less, still more preferably 7% by mass or less with respect to the total amount of the active material layer. The electron conductivity of the active material itself is low, the electrode resistance can be decreased by the amount of the electric conductive auxiliary, and the following effects are exerted by regulating the blending ratio (content) of the electric conductive auxiliary in the active material layer to be in the above range. That is, it is possible to sufficiently ensure the electron conductivity without hindering the electrode reaction, to suppress a decrease in energy density due to a decrease in electrode density, and thus to attain the improvement in energy density due to the improvement in electrode density.

In addition, an electric conductive binder having the functions of both the electric conductive auxiliary and the binder may be used instead of these electric conductive auxiliary and binder or may be concurrently used with one or both of these electric conductive auxiliary and binder. As the electric conductive binder, commercially available TAB-2 (manufactured by Hohsen Corp.) can be used.

(Electrolyte Salt (Lithium Salt))

Examples of the electrolyte salt (lithium salt) may include $Li(C_2F_5SO_2)_2N$, $LiPF_6$, $LiBF_4$, $LiClO_4$, $LiAsF_6$, and $LiCF_3SO_3$.

Ion Conductive Polymer

Examples of the ion conductive polymer may include a polyethylene oxide-based (PEO) polymer and a polypropylene oxide-based (PPO) polymer.

The blending ratio of the components contained in the positive electrode active material layer and the negative electrode active material layer is not particularly limited. The blending ratio can be adjusted by appropriately referring to known knowledge on nonaqueous solvent secondary batteries.

The thickness of each active material layer (the active material layer on one side of the current collector) is also not particularly limited, and conventionally known knowledge on batteries can be appropriately referred to. As an example, the thickness of each active material layer is usually about from 1 to 500 μm and preferably from 2 to 100 μm in consideration of the intended use (output-oriented, energy-oriented, or the like) of the battery and ion conductivity.

<Current Collector>

The current collectors 11 and 12 are composed of an electric conductive material. The size of the current collector is determined according to the application of the battery. For example, a current collector having a large area is used when the current collector is used in a large battery requiring a high-energy density.

The thickness of the current collector is also not particularly limited. The thickness of the current collector is usually about from 1 to 100 µm.

The shape of the current collector is also not particularly limited. In the stacked type battery 10 illustrated in FIG. 1, a mesh shape (expanded grid or the like) or the like can be used in addition to the current collector foil.

Incidentally, it is desirable to use a current collecting foil in the case of directly forming a thin film alloy of the negative electrode active material on the negative electrode current collector 11 by a sputtering method or the like.

The material constituting the current collector is not particularly limited. For example, a metal or a resin in which an electric conductive filler is added to an electric conductive polymer material or an electric nonconductive polymer material can be employed.

Specifically, examples of the metal may include aluminum, nickel, iron, stainless steel, titanium, and copper. In addition to these, a clad material of nickel with aluminum, a clad material of copper with aluminum, a plated material of a combination of these metals, or the like can be preferably used. In addition, it may be a foil fabricated by covering aluminum on a metal surface. Among them, aluminum, stainless steel, copper, and nickel are preferable from the viewpoints of electron conductivity, action potential of battery, adhesive property of the negative electrode active material to the current collector by sputtering, and the like.

In addition, examples of the electric conductive polymer material may include polyaniline, polypyrrole, polythiophene, polyacetylene, polyparaphenylene, polyphenylenevinylene, polyacrylonitrile, and polyoxadiazole. Since such an electric conductive polymer material exhibits sufficient electric conductivity even without adding an electric conductive filler thereto and it is thus advantageous from the viewpoint of facilitating the production process or decreasing the weight of the current collector.

Examples of the electric nonconductive polymer material may include polyethylene (PE; high density polyethylene (HDPE), low density polyethylene (LDPE), and the like), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), or polystyrene (PS). Such an electric nonconductive polymer material can exhibit excellent electric potential resistance or solvent resistance.

An electric conductive filler may be added to the electric conductive polymer material or electric nonconductive polymer material described above if necessary. An electric conductive filler is necessarily essential in order to impart electric conductivity to the resin particularly in a case in which the resin to be the base material of the current collector is composed only of an electric nonconductive polymer.

The electric conductive filler can be used without being particularly limited as long as it is a substance exhibiting electric conductivity. Examples of a material exhibiting excellent electric conductivity, electric potential resistance, or lithium ion shielding property may include metal and electric conductive carbon. The metal is not particularly limited, but it is preferable to contain at least one kind of metal selected from the group consisting of Ni, Ti, Al, Cu, Pt, Fe, Cr, Sn, Zn, In, Sb, and K or an alloy or metal oxide containing these metals. In addition, the electric conductive carbon is not particularly limited. It is preferably one that contains at least one kind selected from the group consisting of acetylene black, vulcan, black pearl, carbon nanofiber, Ketjen black, carbon nanotube, carbon nanohorn, carbon nanoballoon, and fullerene.

The amount of the electric conductive filler added is not particularly limited as long as it is an amount in which sufficient electric conductivity can be imparted to the current collector, and it is generally about from 5 to 35% by mass.

<Electrolyte Layer>

As the electrolyte constituting the electrolyte layer 17, a liquid electrolyte or a polymer electrolyte can be used.

The liquid electrolyte has a form in which a lithium salt (electrolyte salt) is dissolved in an organic solvent. Examples of the organic solvent may include carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and methyl propyl carbonate (MPC).

In addition, as the lithium salt, it is possible to employ a compound that can be added to the active material layer of an electrode such as $Li(CF_3SO_2)_2N$, $Li(C_2F_5SO_2)_2N$, $LiPF_6$, $LiBF_4$, $LiAsF_6$, $LiTaF_6$, $LiClO_4$, or $LiCF_3SO_3$.

Meanwhile, the polymer electrolyte is classified into a gel electrolyte containing an electrolytic solution and an intrinsic polymer electrolyte which does not contain an electrolytic solution.

The gel electrolyte has a configuration in which the liquid electrolyte (electrolytic solution) is injected into a matrix polymer composed of an ion conductive polymer. It is excellent to use a gel polymer electrolyte as the electrolyte from the viewpoint that the fluidity of the electrolyte is eliminated and ionic conduction between the respective layers is easily shielded.

Examples of the ion conductive polymer to be used as the matrix polymer may include polyethylene oxide (PEO), polypropylene oxide (PPO), and a copolymer thereof. Such a polyalkylene oxide-based polymer can readily dissolve an electrolyte salt such as a lithium salt.

The proportion of the liquid electrolyte (electrolytic solution) in the gel electrolyte is not particularly limited, but it is preferably set to about several percent by mass to 98% by mass from the viewpoint of ionic conductivity and the like. In the present embodiment, there is an effect particularly for a gel electrolyte containing a large amount of electrolytic solution, namely, having a proportion of the electrolytic solution of 70% by mass or more.

Incidentally, a separator may be used in the electrolyte layer in a case in which the electrolyte layer is composed of a liquid electrolyte, a gel electrolyte, or an intrinsic polymer electrolyte. Examples of the specific form of the separator (including a nonwoven fabric) may include a microporous membrane formed of a polyolefin such as polyethylene or polypropylene, a porous flat plate, or a nonwoven fabric.

The intrinsic polymer electrolyte has a configuration in which a supporting salt (lithium salt) is dissolved in the matrix polymer described above, and it does not contain an organic solvent as a plasticizer. Hence, liquid leakage from the battery is not concerned and the reliability of the battery can be improved in a case in which the electrolyte layer is composed of the intrinsic polymer electrolyte.

A matrix polymer of the gel electrolyte or the intrinsic polymer electrolyte can exert excellent mechanical strength by forming a crosslinked structure. In order to form a crosslinked structure, a polymerizable polymer (for example, PEO or PPO) for forming a polymer electrolyte may be subjected to a polymerization treatment such as heat polymerization, ultraviolet polymerization, radiation polymerization, or electron beam polymerization using a proper polymerization initiator.

<Current Collecting Plate and Lead>

A current collecting plate may be used for the purpose of taking out the electric current to the outside of the battery. The current collecting plate is electrically connected to the current collector and the lead and brought out to the outside of the laminate sheet of the battery outer packaging material.

The material constituting the current collecting plate is not particularly limited and a known highly electric conductive material which is conventionally used as a current collecting plate for lithium ion secondary battery can be used. As the material constituting the current collecting plate, for example, metal materials such as aluminum, copper, titanium, nickel, stainless steel (SUS), and any alloy thereof are preferable, and aluminum, copper, and the like are more preferable from the viewpoint of light weight, corrosion resistance, and high electric conductivity. Incidentally, the same material or different materials may be used in the positive electrode current collecting plate and the negative electrode current collecting plate.

A positive terminal lead and a negative terminal lead are used if necessary. As a material for the positive electrode terminal lead and the negative electrode terminal lead, a known terminal lead that is used in a lithium ion secondary battery can be used. Incidentally, it is preferable that the portion to be brought out from a battery outer packaging material 29 be covered with a heat-shrinkable tube or the like exhibiting heat resistance and insulation property so as not to affect the products (for example, automotive parts and especially electronic devices) by coming in contact with peripheral devices, wires, and the like and thus causing a short circuit.

<Battery Outer Packaging Material>

As the battery outer packaging material 29, it is possible to use a bag-shaped case which can cover the power generating element and uses a laminate film containing aluminum in addition to a known metal can case. As the laminate film, for example, a laminate film having a three-layer structure formed by laminating PP, aluminum, and nylon in this order, or the like can be used, but the laminate film is not limited to these. A laminate film is preferable from the viewpoint of having a high output and cooling performance and being able to be suitably utilized in a battery for large device for EV and HEV.

Incidentally, the lithium ion secondary battery can be produced by a conventionally known production method.

<Configuration of Appearance of Lithium Ion Secondary Battery>

Figure 2:
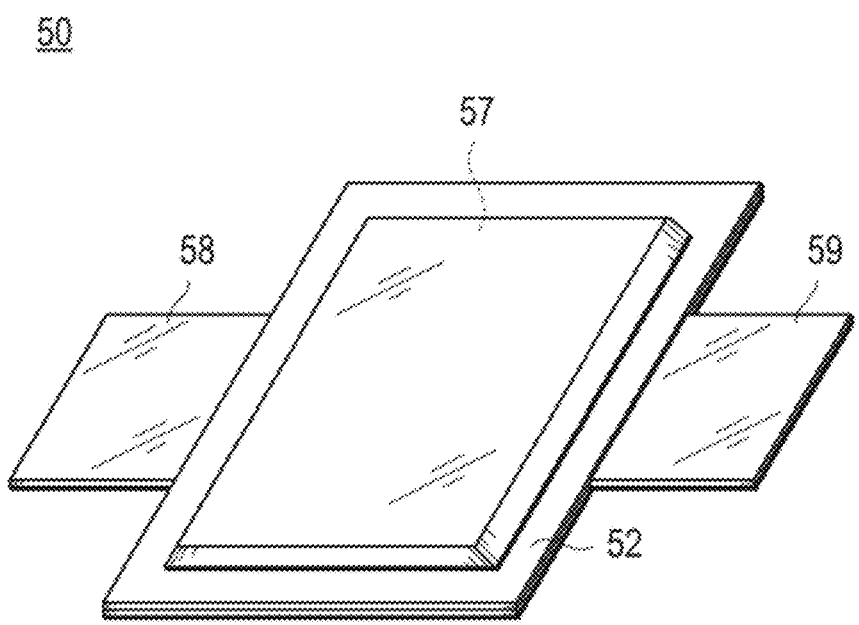
FIG. 2 is a perspective view which schematically illustrates the appearance of a stacked type flat lithium ion secondary battery of a representative embodiment of the electric device according to the present invention.

FIG. 2 is a perspective view which illustrates the appearance of a stacked type flat lithium ion secondary battery.

As illustrated in FIG. 2, a stacked type flat lithium ion secondary battery 50 has a rectangular flat shape, and a positive electrode current collecting plate 59 and a negative electrode current collecting plate 58 for taking out electric power are pulled out from both side portions thereof. A power generating element 57 is wrapped in a battery outer packaging material 52 of the lithium ion secondary battery 50, the periphery of the battery outer packaging material 52 is heat-sealed, and the power generating element 57 is hermetically sealed in a state in which the positive electrode current collecting plate 59 and the negative electrode current collecting plate 58 are pulled out to the outside. Here, the power generating element 57 corresponds to the power generating element 21 of the lithium ion secondary battery (stacked type battery) 10 illustrated in FIG. 1. The power generating element 57 is formed by stacking a plurality of single battery layers (single cells) 19 including the positive electrode (positive electrode active material layer) 13, the electrolyte layer 17, and the negative electrode (negative electrode active material layer) 15.

Incidentally, the lithium ion secondary battery is not limited to a stacked type one having a flat shape (laminate cell). The lithium ion secondary battery may be one having a cylindrical shape (coin cell) or one having a prismatic shape (square cell) as a wound type lithium ion battery, one obtained by deforming the one having a cylindrical shape to have a rectangular flat shape, and further a cylindrical cell, and it is not particularly limited. In one having a cylindrical or prismatic shape, a laminate film or a conventional cylindrical can (metal can) may be used as the outer packaging material thereof, and the outer packaging material is not particularly limited. Preferably, the power generating element is packaged in an aluminum laminate film. The weight saving can be achieved by this form.

In addition, bringing out of the positive electrode current collecting plate 59 and the negative electrode current collecting plate 58 illustrated in FIG. 2 is not also particularly limited. The positive electrode current collecting plate 59 and the negative electrode current collecting plate 58 may be pulled out from the same side or each of the positive electrode current collecting plate 59 and the negative electrode current collecting plate 58 may be divided into a plurality of pieces and taken out from each side, and the bringing out is not limited to that illustrated in FIG. 2. In addition, in a wound type lithium ion battery, terminals may be formed by utilizing, for example, a cylindrical can (metal can) instead of a current collecting plate.

As described above, the negative electrode and the lithium ion secondary battery which are formed by using the negative electrode active material for lithium ion secondary battery of the present embodiment can be suitably utilized as a large capacity power source for electric vehicles, hybrid electric vehicles, fuel cell vehicles, hybrid fuel cell vehicles, and the like. That is, they can be suitably utilized in a vehicle driving power source and an auxiliary power source which are required to have a high-volume energy density and a high-volume output density.

Incidentally, in the above embodiments, a lithium ion battery has been illustrated as an example of the electric device, but the present invention is not limited to this and can be applied to other types of secondary batteries as well as primary batteries. In addition, the present invention can be applied not only to batteries but also to capacitors.

EXAMPLES

The present invention will be described in more detail with reference to the following Examples. However, the technical scope of the present invention is not limited to only the following Examples.

Example 1: Liquid Quenching Solidification Method+Mechanical Alloying Treatment by Planetary Ball Mill, Ternary Alloy Example 1-1

[Production of Silicon-Containing Alloy]

An ingot of Si alloy (Si: 60% by mass, Sn: 10% by mass, and Ti: 30% by mass) was fabricated using a high-purity metal Si ingot (5 N), a high-purity Ti wire (3 N), and a high-purity Sn plate (3 N) by an arc melting method.

Subsequently, a silicon-containing alloy was fabricated using the ingot obtained above as a parent alloy by a liquid quenching solidification method. Specifically, by using a liquid quenching solidification apparatus NEV-A05 manufactured by NISSIN GIKEN Corporation, an ingot (parent alloy) of $Si_{60}Sn_{10}Ti_{30}$ was put in a quartz nozzle set in a chamber which was subjected to Ar purge and then to pressure reduction so as to have a pressure of 0.03 MPa as a gauge pressure, melted by high-frequency induction heating, and then sprayed onto a Cu roll being rotated at the number of revolutions of 4000 rpm (circumferential velocity: 41.9 m/sec) at an spraying pressure of 0.05 MPa, thereby fabricating a thin strip alloy (quenched thin strip).

Thereafter, the thin strip alloy (quenched thin strip) obtained above was crushed so as to have a size of D50=7 μm (D90=20 μm) as a diameter, and the crushed material thus obtained was subjected to a mechanical alloying treatment. Specifically, by using a planetary ball mill apparatus P-6 manufactured by Fritsch GmbH, zirconia crushing balls and the crushed material were put in a zirconia crushing pot, and the crushed material was alloyed by being subjected to a mechanical alloying treatment under the conditions of 600 rpm and 48 hours. Thereafter, the alloy was subjected to a crushing treatment at 400 rpm for 1 hour to obtain a silicon-containing alloy (negative electrode active material). Incidentally, the average particle diameter of the silicon-containing alloy (negative electrode active material) powder thus obtained was D50=1.2 μm.

[Fabrication of Negative Electrode]

Mixed were 80 parts by mass of the silicon-containing alloy ($Si_{60}Sn_{10}Ti_{30}$) thus produced as a negative electrode active material, 5 parts by mass of acetylene black as an electric conductive auxiliary, and 15 parts by mass of polyamide-imide as a binder, the mixture thus obtained was dispersed in N-methylpyrrolidone to obtain a negative electrode slurry. Subsequently, the negative electrode slurry thus obtained was uniformly coated on both sides of a negative electrode current collector formed of a copper foil so that the thickness of each of the negative electrode active material layers was 30 μm, and dried in a vacuum for 24 hours, thereby obtaining a negative electrode.

[Fabrication of Lithium Ion Secondary Battery (Coin Cell)]

The negative electrode thus fabricated and the counter electrode Li were allowed to face each other, and a separator (polyolefin, film thickness: 20 μm) was disposed therebetween. Subsequently, the stacked body of the negative electrode, the separator, and the counter electrode Li was disposed on the bottom side of a coin cell (CR 2032, material: stainless steel (SUS 316)). Furthermore, a gasket was fitted to maintain the insulation between the positive electrode and the negative electrode, the following electrolytic solution was injected into the coin cell by using a syringe, a spring and a spacer were stacked thereon, the upper side of the coin cell was superimposed thereon, and caulking was conducted to hermetically seal the coin cell, thereby obtaining a lithium ion secondary battery (coin cell).

Incidentally, as the electrolytic solution, a solution prepared by dissolving lithium hexafluorophosphate ($LiPF_6$) as a lithium salt in an organic solvent in which ethylene carbonate (EC) and diethyl carbonate (DEC) were mixed at a proportion of EC:DEC=1:2 (volume ratio) at a concentration of 1 mol/L was used.

Example 1-2

A negative electrode active material, a negative electrode, and a lithium ion secondary battery (coin cell) were fabricated by the same method as in the Example 1-1 described above except the spraying pressure in the liquid quenching solidification method was set to 0.03 MPa and the time for the mechanical alloying treatment was set to 36 hours. Incidentally, the average particle diameter of the silicon-containing alloy (negative electrode active material) powder thus obtained was 1.8 μm.

Example 1-3

A negative electrode active material, a negative electrode, and a lithium ion secondary battery (coin cell) were fabricated by the same method as in the Example 1-1 described above except the time for the mechanical alloying treatment was set to 24 hours. Incidentally, the average particle diameter of the silicon-containing alloy (negative electrode active material) powder thus obtained was 7.8 μm.

Example 1-4

A negative electrode active material, a negative electrode, and a lithium ion secondary battery (coin cell) were fabricated by the same method as in the Example 1-1 described above except the time for the mechanical alloying treatment was set to 12 hours. Incidentally, the average particle diameter of the silicon-containing alloy (negative electrode active material) powder thus obtained was 8.2 μm.

COMPARATIVE EXAMPLE

A negative electrode and a lithium ion secondary battery (coin cell) were fabricated by the same method as in the Example 1-1 described above except that the composition of the parent alloy was changed to $Si_{60}Sn_{20}Ti_{20}$ and one prepared by crushing the thin strip alloy (quenched thin strip) obtained by the liquid quenching solidification method so as to have a size of D50=7.2 μm (D90=20 μm) as a diameter was used as the negative electrode active material.

Example 2: Mechanical Alloying Treatment by Stirring Ball Mill, Ternary Alloy

Example 2-1

A silicon-containing alloy having a composition of $Si_{65}Sn_5Ti_{30}$ (the composition ratio is a mass ratio) was produced by the following method.

Specifically, by using a stirring ball mill apparatus C-01M manufactured by ZOZ GmbH, 1920 g of zirconia crushing balls (φ: 5 mm) and 1 g of carbon (SGL) were put in a SUS crushing pot and the carbon was then subjected to a pre-crushing treatment at 1000 rpm for 10 minutes. Thereafter, 100 g of the respective raw material powders (high-purity metal Si ingot (5 N), high-purity Ti wire (3 N), and high-purity Sn plate (3 N)) of the alloy was put therein, alloyed at 1500 rpm for 5 hours (alloying treatment), and then subjected to a fine crushing treatment at 400 rpm for 1 hour, thereby obtaining a silicon-containing alloy (negative electrode active material). Incidentally, in the stirring ball mill apparatus used in the present Example, it was calculated that the centrifugal force Gn1=176.0 [G] since the revolution radius rs=0.070 [m], the rotation radius rpt=0 [m], and the number of revolutions rpm=1500 [revolutions/minute]. The average particle diameter (D50) of the silicon-containing alloy (negative electrode active material) powder thus obtained was 5.4 μm.

Moreover, a negative electrode and a lithium ion secondary battery (coin cell) were fabricated using the silicon-containing alloy (negative electrode active material) thus obtained by the same method as in the Example 1-1 described above.

Example 2-2

A negative electrode active material, a negative electrode, and a lithium ion secondary battery (coin cell) were fabricated by the same method as in the Example 2-1 described above except that the composition of the silicon-containing alloy was changed to $Si_{66}Sn_5Ti_{29}$. Incidentally, the average particle diameter (D50) of the silicon-containing alloy (negative electrode active material) powder thus obtained was 6.7 µm.

Example 2-3

A negative electrode active material, a negative electrode, and a lithium ion secondary battery (coin cell) were fabricated by the same method as in the Example 2-1 described above except that the composition of the silicon-containing alloy was changed to $Si_{67}Sn_5Ti_{28}$. Incidentally, the average particle diameter (D50) of the silicon-containing alloy (negative electrode active material) powder thus obtained was 4.8 µm.

Example 3: Mechanical Alloying Treatment by Stirring Ball Mill, Quaternary System Alloy Example 3-1

A silicon-containing alloy having a composition of $Si_{68.5}Sn_{2.5}Ti_{28.5}Al_{0.5}$ (the composition ratio is a mass ratio) was produced by the following method.

Specifically, by using a stirring ball mill apparatus C-01M manufactured by ZOZ GmbH, 1920 g of zirconia crushing balls (φ: 5 mm) and 1 g of carbon (SGL) were put in a SUS crushing pot and the carbon was then subjected to a pre-crushing treatment at 1000 rpm for 10 minutes. Thereafter, 100 g of the respective raw material powders (high-purity metal Si ingot (5 N), high-purity Ti wire (3 N), high-purity Sn plate (3 N), and high-purity Aluminum powder (3N) manufactured by KOJUNDO CHEMICAL LABORATORY CO., LTD.) of the alloy was put therein, alloyed at 1500 rpm for 5 hours (alloying treatment), and then subjected to a fine crushing treatment at 400 rpm for 1 hour, thereby obtaining a silicon-containing alloy (negative electrode active material). Incidentally, in the stirring ball mill apparatus used in the present Example, it was calculated that the centrifugal force Gn1=176.0 [G] since the revolution radius rs=0.070 [m], the rotation radius rp1=0 [m], and the number of revolutions rpm=1500 [revolutions/minute]. The average particle diameter (D50) of the silicon-containing alloy (negative electrode active material) powder thus obtained was 7.8 µm.

Moreover, a negative electrode and a lithium ion secondary battery (coin cell) were fabricated using the silicon-containing alloy (negative electrode active material) thus obtained by the same method as in the Example 1-1 described above.

Example 3-2

A negative electrode active material, a negative electrode, and a lithium ion secondary battery (coin cell) were fabricated by the same method as in the Example 3-1 described above except that the composition of the silicon-containing alloy was changed to $Si_{69}Sn_2Ti_{28.5}Al_{0.5}$. Incidentally, the average particle diameter (D50) of the silicon-containing alloy (negative electrode active material) powder thus obtained was 6.4 µm.

Example 3-3

A negative electrode active material, a negative electrode, and a lithium ion secondary battery (coin cell) were fabricated by the same method as in the Example 3-1 described above except that the composition of the silicon-containing alloy was changed to $Si_{67.5}Sn_2Ti_{29}Al_{1.5}$. Incidentally, the average particle diameter (D50) of the silicon-containing alloy (negative electrode active material) powder thus obtained was 3.2 µm.

[Analysis of Textural Structure of Negative Electrode Active Material]

The textural structure of the negative electrode active material (silicon-containing alloy) fabricated in the Example 1-1 was analyzed.

Figure 3A:
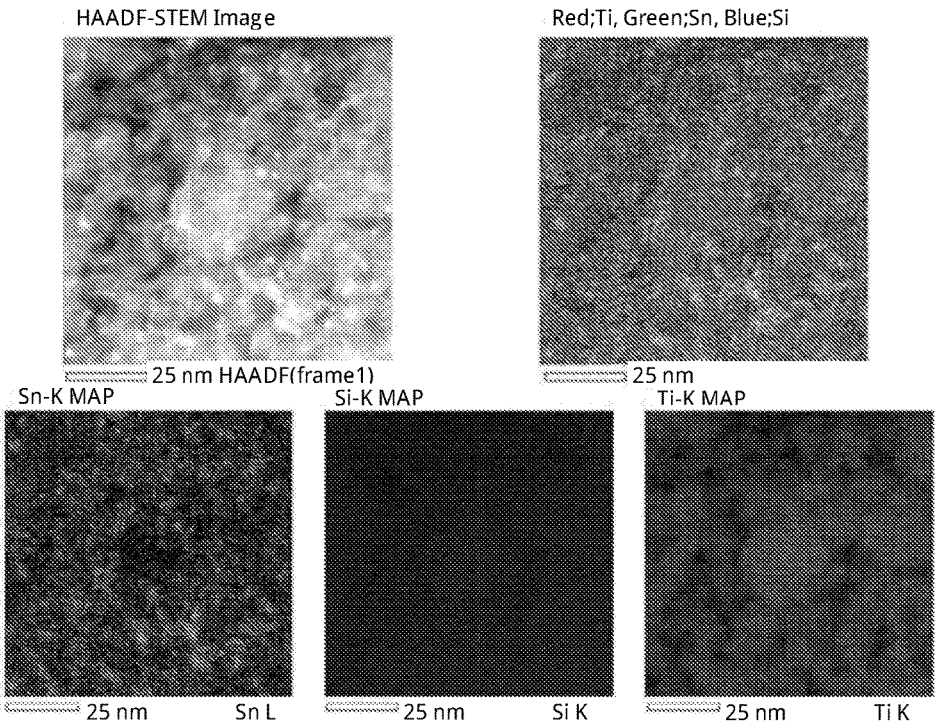
FIG. 3A is a high magnification photograph which illustrates the observation results for the microtextural structure of the negative electrode active material (silicon-containing alloy) of Example 1-1 by HAADF-STEM. The upper left photograph in FIG. 3A is an observation image (high magnification) of the negative electrode active material (silicon-containing alloy) of Example 1-1 by a high angle annular dark field scanning transmission electron microscope (HAADF-STEM). In addition, the upper right photograph in FIG. 3A is an image obtained by conducting element intensity mapping of the same visual field as the observation image by EDX (energy dispersive X-ray spectroscopy). Moreover, the lower photographs in FIG. 3A are mapping images for the respective elements of Sn, Si, and Ti from the left.

The upper left photograph in FIG. 3A is an observation image (high magnification) of the negative electrode active material (silicon-containing alloy) of the Example 1-1 by a high angle annular dark field scanning transmission electron microscope (HAADF-STEM). In addition, the upper right photograph in FIG. 3A is an image obtained by conducting element intensity mapping of the same visual field as the observation image by EDX (energy dispersive X-ray spectroscopy). Moreover, the lower photographs in FIG. 3A are mapping images for the respective elements of Sn, Si, and Ti from the left. From these results, it is considered that Si is also present at a portion at which Ti is present and thus a silicide ($TiSi_2$) phase is present at the portion. It has also been found that Si is present at a portion at which Ti is not present as well and Sn is present at a portion at which Ti is not present but Si is present.

Figure 3B:
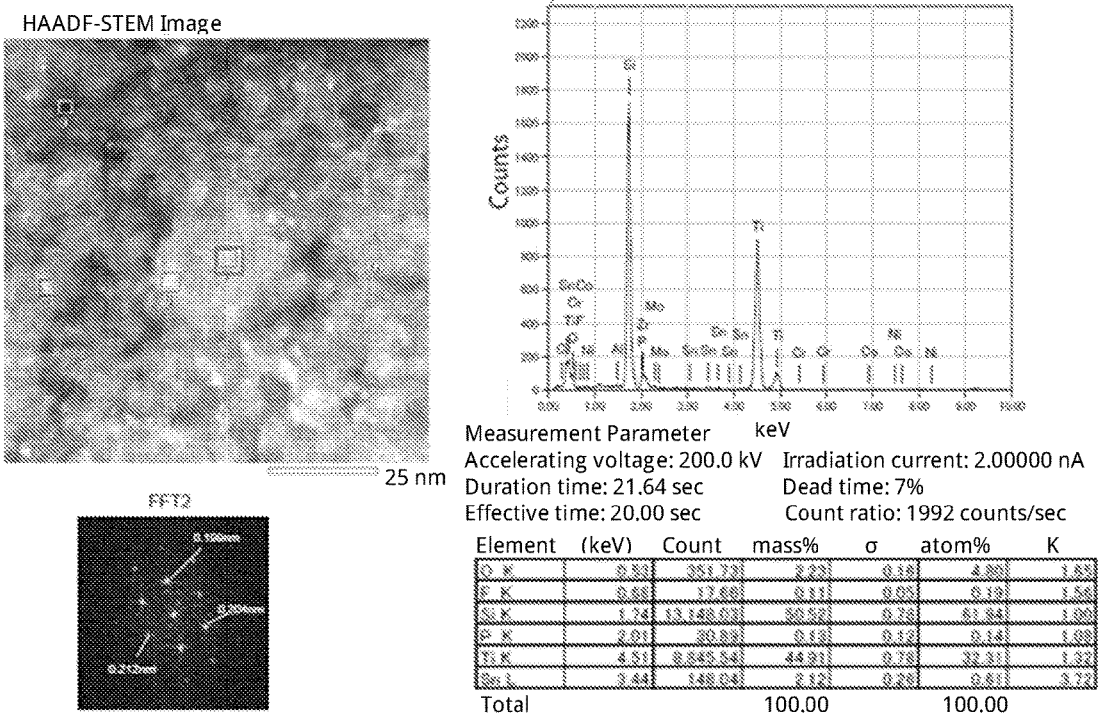
FIG. 3B is a photograph and a graph which illustrate the analysis results for the microtextural structure of the silicide phase of the negative electrode active material (silicon-containing alloy) of Example 1-1. The upper left photograph in FIG. 3B is an observation image of the negative electrode active material (silicon-containing alloy) of Example 1-1 by HAADF-STEM, which is the same as the upper left photograph in FIG. 3A. In addition, the lower left photograph in FIG. 3B is a diffraction pattern acquired by subjecting the image of a portion enclosed by a bold line (a portion considered to have a silicide ($TiSi_2$) phase) in the observation image to fast Fourier transformation. Moreover, the graph and table on the right side in FIG. 3B are the EDX spectrum obtained for the same portion.
Figure 4A:
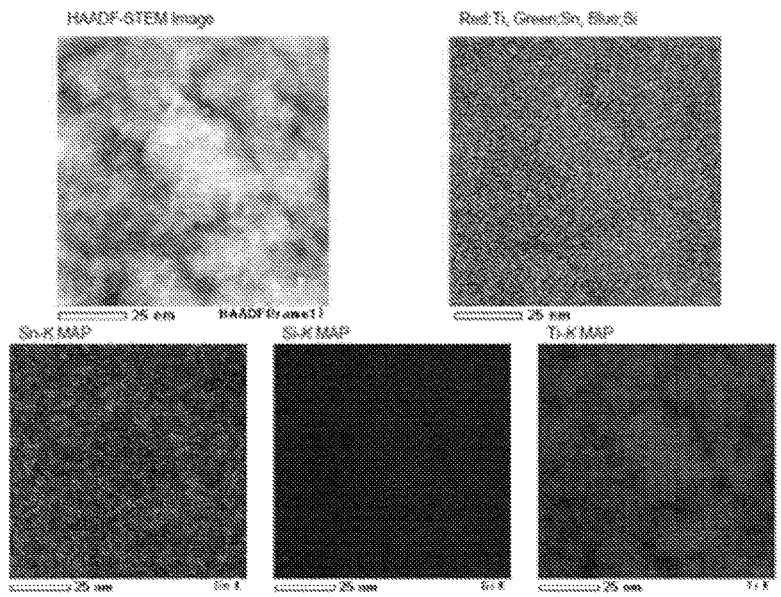
FIG. 4A is a high magnification photograph which illustrates the observation results for the microtextural structure of the negative electrode active material (silicon-containing alloy) of Example 1-2 by HAADF-STEM. The upper left photograph in FIG. 4A is an observation image (high magnification) of the negative electrode active material (silicon-containing alloy) of Example 1-2 by a high angle annular dark field scanning transmission electron microscope (HAADF-STEM). In addition, the upper right photograph in FIG. 4A is an image obtained by conducting element intensity mapping of the same visual field as the observation image by EDX (energy dispersive X-ray spectroscopy). Moreover, the lower photographs in FIG. 4A are mapping images for the respective elements of Sn, Si, and Ti from the left.
Figure 4B:
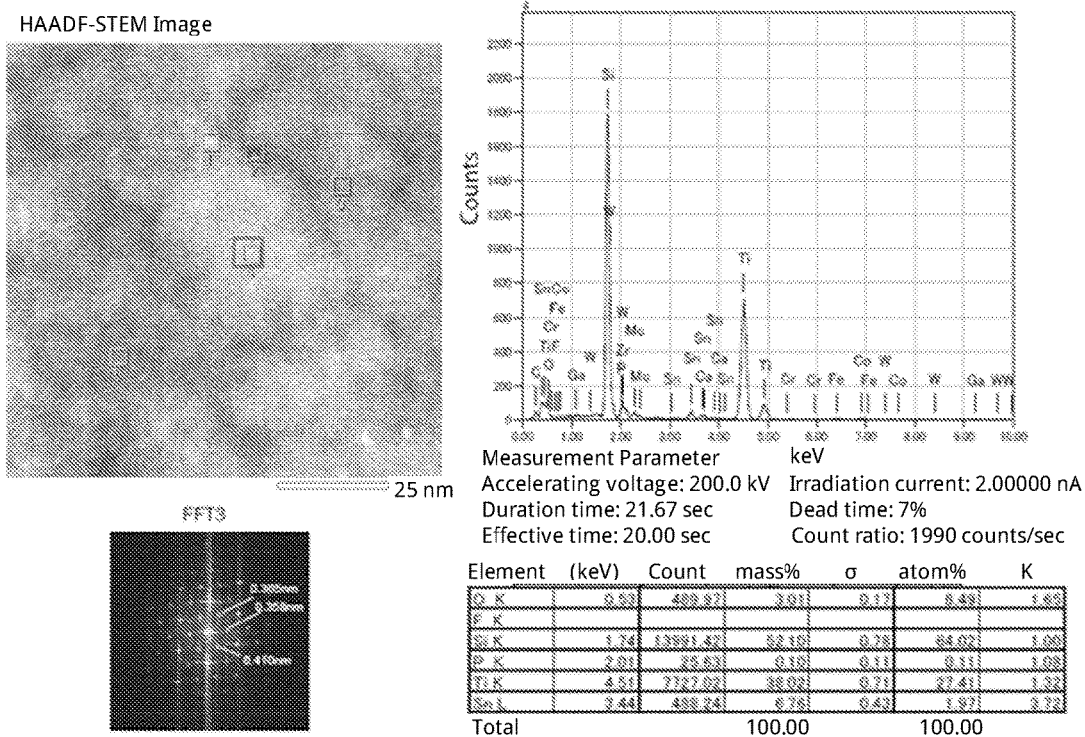
FIG. 4B is a photograph and a graph which illustrate the analysis results for the microtextural structure of the silicide phase of the negative electrode active material (silicon-containing alloy) of Example 1-2. The upper left photograph in FIG. 4B is an observation image of the negative electrode active material (silicon-containing alloy) of Example 1-2 by HAADF-STEM, which is the same as the upper left photograph in FIG. 4A. In addition, the lower left photograph in FIG. 4B is a diffraction pattern acquired by subjecting the image of a portion enclosed by a bold line (a portion considered to have a silicide ($TiSi_2$) phase) in the observation image to fast Fourier transformation. Moreover, the graph and table on the right side in FIG. 4B are the EDX spectrum obtained for the same portion.
Figure 5C:
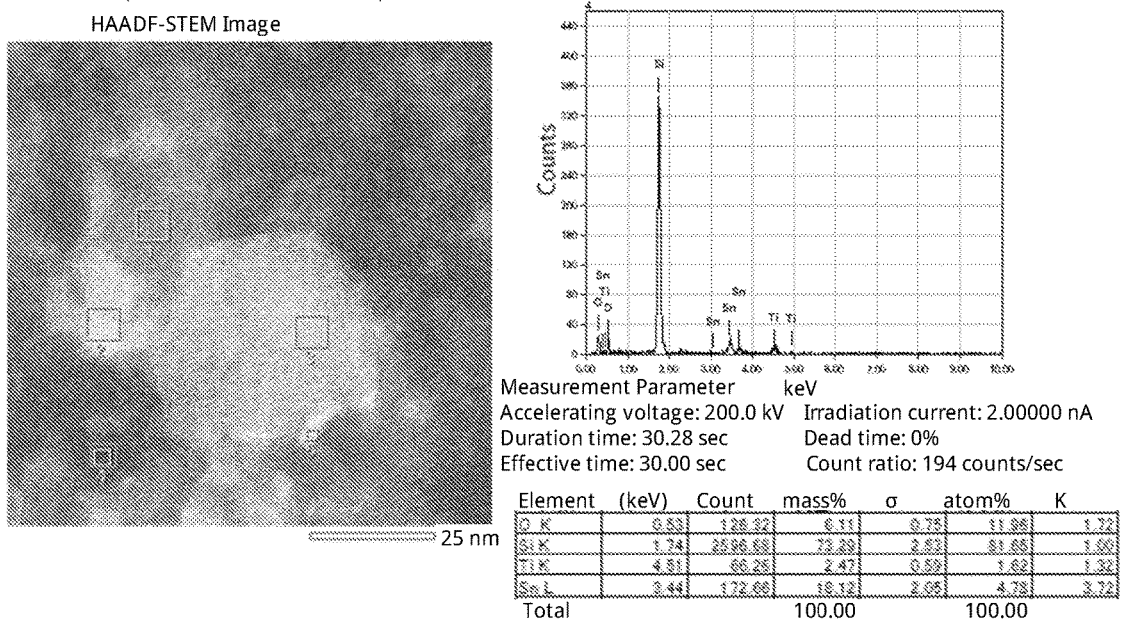
FIG. 5C is a photograph and a graph which illustrate the analysis results for the microtextural structure of the a-Si phase of the negative electrode active material (silicon-containing alloy) of Comparative Example. The upper left photograph in FIG. 5C is an observation image of the negative electrode active material (silicon-containing alloy) of Comparative Example by HAADF-STEM, which is the same as the upper left photograph in FIG. 5A. In addition, the lower left photograph in FIG. 5C is a diffraction pattern acquired by subjecting the image of a portion enclosed by a bold line (a portion at which Ti is not present but Si is present) in the observation image to fast Fourier transformation. Moreover, the graph and table on the right side in FIG. 5C are the EDX spectrum obtained for the same portion.
Figure 5D:
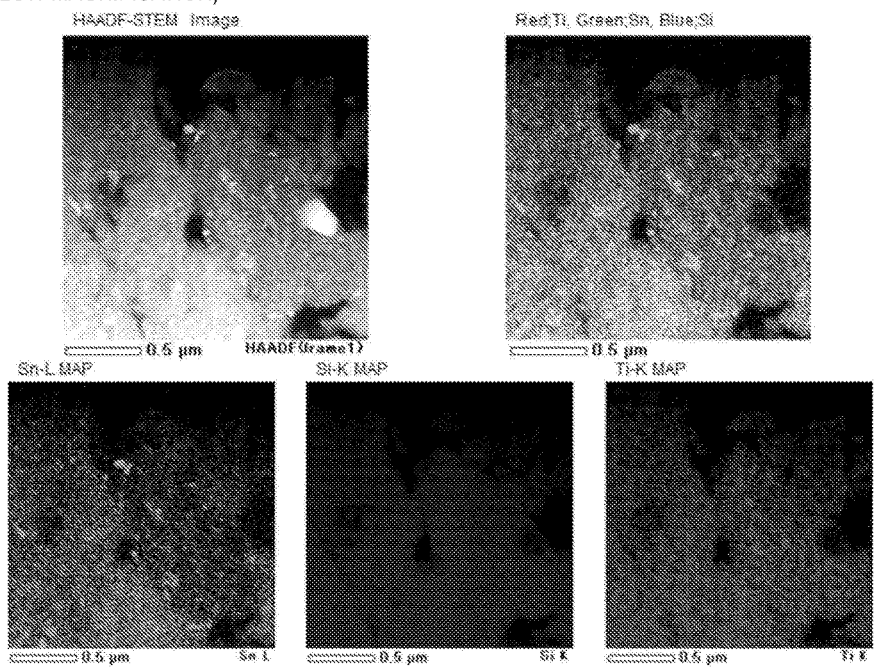
FIG. 5D is a low magnification photograph which illustrates the observation results for the microtextural structure of the negative electrode active material (silicon-containing alloy) of Comparative Example by HAADF-STEM.

Subsequently, the upper left photograph in FIG. 3B is an observation image of the negative electrode active material (silicon-containing alloy) of the Example 1-1 by HAADF-STEM, which is the same as the upper left photograph in FIG. 3A. In addition, the lower left photograph in FIG. 3B is a diffraction pattern acquired by subjecting the image of a portion enclosed by a bold line (a portion considered to have a silicide ($TiSi_2$) phase) in the observation image to fast Fourier transformation, and the graph and table on the right side in FIG. 3B are the EDX spectrum obtained for the same portion. It has been confirmed that the portion is a silicide ($TiSi_2$) phase since regular diffraction patterns are observed (presence of crystal structure) in the diffraction pattern and Si and Ti are present at an atomic ratio of approximately 2:1 in the EDX spectrum.

In the same manner, the upper left photograph in FIG. 3C is an observation image of the negative electrode active material (silicon-containing alloy) of the Example 1-1 by HAADF-STEM, which is the same as the upper left photograph in FIG. 3A. In addition, the lower left photograph in FIG. 3C is a diffraction pattern acquired by subjecting the image of a portion enclosed by a bold line (a portion at which Ti is not present but Si is present) in the observation image to fast Fourier transformation, and the graph and table on the right side in FIG. 3C are the EDX spectrum obtained for the same portion. It has been confirmed that the portion is an a-Si phase since regular diffraction patterns are not observed in the diffraction pattern and Si is present as a main component in the EDX spectrum. Incidentally, in the EDX spectrum in FIG. 3C, it has also been confirmed that Sn is contained in the a-Si phase and it is considered that Sn is present in the a-Si phase in the form of a solid solution since Sn did not form a silicide with Si.

Incidentally, FIG. 3D is an observation image (low magnification) of the negative electrode active material (silicon-containing alloy) of the Example 1-1 by HAADF-STEM. When the above results are summarized, it has been found that the negative electrode active material (silicon-containing alloy) of the Example 1-1 had a structure in which an a-Si phase containing amorphous or low crystalline Si containing Sn in the crystal structure of Si in the form of a solid solution is dispersed in a silicide ($TiSi_2$) phase containing a silicide of a transition metal as a main component. In addition, it has been confirmed that the negative electrode active material (silicon-containing alloy) of the Example 1-2 also has the same structure from the observation results illustrated in FIGS. 4A to 4D. Furthermore, it has been confirmed that the negative electrode active material (silicon-containing alloy) obtained in each of the Examples 1-3 and 1-4 also has the same structure although the results are not illustrated.

Meanwhile, as can be seen from the observation results illustrated in FIGS. 5A to 5D, the same structure as that in the Examples has not been confirmed but a structure in which a silicide ($TiSi_2$) phase is dispersed in an a-Si phase has been confirmed, in the negative electrode active material (silicon-containing alloy) of the Comparative Example.

In addition, it has been confirmed that the negative electrode active material (silicon-containing alloy) obtained in each of the Examples 2-1 to 2-3 also has the same structure (namely, a structure in which an a-Si phase containing amorphous or low crystalline Si containing Sn in the crystal structure of Si in the form of a solid solution is dispersed in a silicide ($TiSi_2$) phase containing a silicide of a transition metal as a main component) as that of the negative electrode active materials (silicon-containing alloys) obtained in the Examples 1-1 to 1-4 although the results thereof are not illustrated.

Furthermore, it has been confirmed that the negative electrode active material (silicon-containing alloy) obtained in each of the Examples 3-1 to 3-3 also has the same structure (namely, a structure in which an a-Si phase containing amorphous or low crystalline Si containing Sn in the crystal structure of Si in the form of a solid solution is dispersed in a silicide ($TiSi_2$) phase containing a silicide of a transition metal as a main component) as that of the negative electrode active materials (silicon-containing alloys) obtained in the Examples 1-1 to 1-4.

Figure 9A:
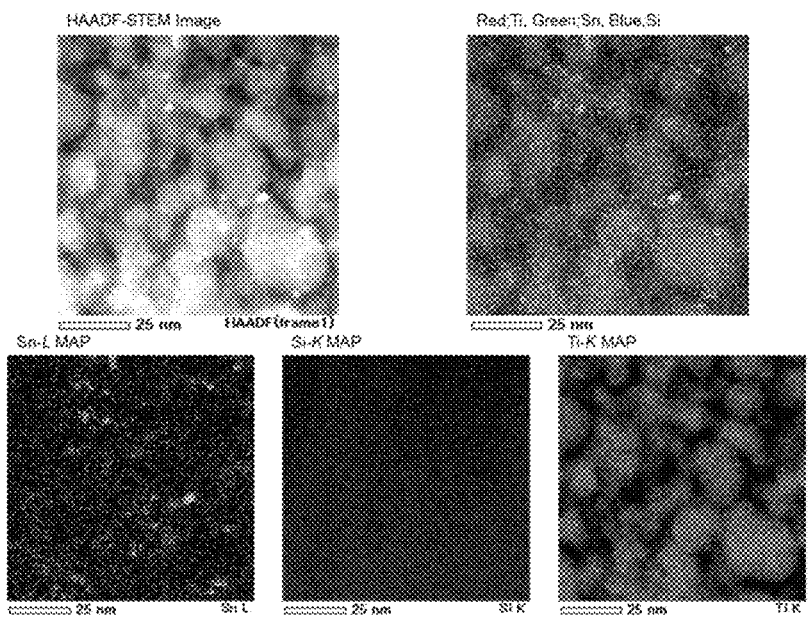
FIG. 9A is a high magnification photograph which illustrates the observation results for the microtextural structure of the negative electrode active material (silicon-containing alloy) of Example 3-1 by HAADF-STEM. The upper left photograph in FIG. 9A is an observation image (high magnification) of the negative electrode active material (silicon-containing alloy) of Example 3-1 by a high angle annular dark field scanning transmission electron microscope (HAADF-STEM). In addition, the upper right photograph in FIG. 9A is an image obtained by conducting element intensity mapping of Sn, Si, and Ti in the same visual field as the observation image by EDX (energy dispersive X-ray spectroscopy). Moreover, the lower photographs in FIG. 9A are mapping images for the respective elements of Sn, Si, and Ti from the left.

Here, the upper left photograph in FIG. 9A is an observation image (high magnification) of the negative electrode active material (silicon-containing alloy) of the Example 3-1 by a high angle annular dark field scanning transmission electron microscope (HAADF-STEM). In addition, the upper right photograph in FIG. 9A is an image obtained by conducting element intensity mapping of Si, Sn, and Ti in the same visual field as the observation image by EDX (energy dispersive X-ray spectroscopy). Moreover, the lower photographs in FIG. 9A are mapping images for the respective elements of Sn, Si, and Ti from the left. From these results, it is considered that Si is also present at a portion at which Ti is present and thus a silicide ($TiSi_2$) phase is present at the portion. In addition, it has been confirmed that Si is present at a portion at which Ti is not present as well, and it has also been found that Sn is present at a high concentration in the boundary region between the portion at which Ti is not present but Si is present and the portion at which Ti is present (the region to be considered as a silicide phase).

Figure 9B:
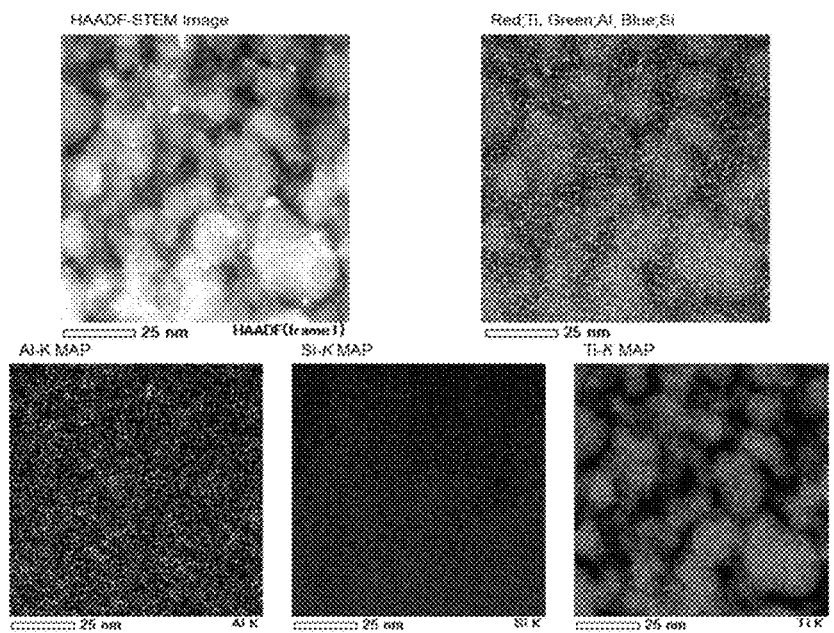
FIG. 9B is a high magnification photograph which illustrates the observation results for the microtextural structure of the negative electrode active material (silicon-containing alloy) of Example 3-1 by HAADF-STEM. The upper left photograph in FIG. 9B is an observation image (high magnification) (which is the same as the image in FIG. 9A) of the negative electrode active material (silicon-containing alloy) of Example 3-1 by a high angle annular dark field scanning transmission electron microscope (HAADF-STEM). In addition, the upper right photograph in FIG. 9B is an image obtained by conducting element intensity mapping of Si, Ti, and Al in the same visual field as the observation image by EDX (energy dispersive X-ray spectroscopy). Moreover, the lower photographs in FIG. 9B are mapping images for the respective elements of Al, Si, and Ti from the left (those for Si and Ti are the same as the images in FIG. 9A).

In the same manner, the upper left photograph in FIG. 9B is an observation image (high magnification) (which is the same as that in FIG. 9A) of the negative electrode active material (silicon-containing alloy) of the Example 3-1 by a high angle annular dark field scanning transmission electron microscope (HAADF-STEM). In addition, the upper right photograph in FIG. 9B is an image obtained by conducting element intensity mapping of Si, Ti, and Al in the same visual field as the observation image by EDX (energy dispersive X-ray spectroscopy). Moreover, the lower photographs in FIG. 9B are mapping images for the respective elements of Al, Si, and Ti from the left (those for Si and Ti are the same as the images in FIG. 9A). From these results, it has been found that Al is present to be uniformly dispersed at the portion at which Ti is not present but Si is present.

[Measurement of Distance between Si Regular Tetrahedrons (Distance between Si—Si) and Size of Periodic Array Region (MRO) in Amorphous Region of Negative Electrode Active Material]

The results for the distance between Si regular tetrahedrons and the size of periodic array region (MRO) in the amorphous region (a-Si phase) measured (calculated) from the inverse Fourier transform image obtained by image analysis using the HAADF-STEM observation image of the negative electrode active material (silicon-containing alloy) fabricated in each of the Examples 1-1 to 1-4, the Comparative Example, the Examples 2-1 to 2-3, and the Examples 3-1 to 3-3 are presented in the following Tables 1 to 3. Incidentally, as already described, the HAADF-STEM observation image of the negative electrode active material (silicon-containing alloy) of the Example 1-1, the diffraction pattern acquired by subjecting this observation image by HAADF-STEM to Fourier transform, and the inverse Fourier transform image acquired by subjecting the diffraction ring portion of the Si (220) plane in this diffraction pattern to inverse Fourier transform are illustrated in FIGS. 6(A) to 6(C), respectively. In addition, the contents of the a-Si phase and the silicide phase and the value of mass ratio of these in the negative electrode active material (silicon-containing alloy) fabricated in each of the Examples 1-1 to 1-4, the Comparative Example, the Examples 2-1 to 2-3, and the Examples 3-1 to 3-3 are also presented in the following Tables 1 to 3.

[Evaluation on Cycle Durability]

The cycle durability of each lithium ion secondary battery (coin cell) fabricated in each of the Examples 1-1 to 1-4, the Comparative Example, the Examples 2-1 to 2-3, and the Examples 3-1 to 3-3 was evaluated under the following charge and discharge test conditions.

(Charge and Discharge Test Conditions)

1) Charge and Discharge Tester: HJ 0501 SMSA (manufactured by HOKUTO DENKO CORP.)

2) Charge and discharge conditions [Charge process] 0.3 C, 2 V→10 mV (constant current and constant voltage mode)

[Discharge process] 0.3 C, 10 mV→2 V (constant current mode)

3) Thermostatic chamber: PFU-3K (manufactured by ESPEC CORP.)

4) Evaluation temperature: 300 K (27° C.).

The evaluation cell was charged from 2 V to 10 mV at 0.1 mA in a constant current and constant voltage mode in a thermostatic chamber set at the above evaluation temperature by using a charge and discharge tester in the charge process (referred to as the process of intercalating Li into the evaluation electrode). Thereafter, the evaluation cell was discharged from 10 mV to 2 V at 0.3 C in a constant current mode in the discharge process (referred to as the process of deintercalating Li from the evaluation electrode). The charge and discharge cycle described above was taken as one cycle, and a charge and discharge test was conducted from the initial cycle (1st cycle) to the 70th cycle under the same charge and discharge conditions. Thereafter, the results for the proportions (discharge capacity retention rate [%]) of the discharge capacities in the 50th cycle and the 70th cycle to the discharge capacity in the 1st cycle (initial discharge capacity) are presented in the following Table 1 together with the results for the initial discharge capacity.

TABLE 1

|  | Composition of silicon-containing alloy | Spraying pressure in liquid quenching solidification method (MPa) | Time for mechanical alloying (planetary) treatment (hr) | a-Si phase Diameter (nm) | a-Si phase Content of available-Si (% by mass) | Silicide phase Diameter (nm) | Silicide phase Content of TiSi$_2$ (% by mass) |
|---|---|---|---|---|---|---|---|
| Example 1-1 | Si$_{60}$Sn$_{10}$Ti$_{30}$ | 0.05 | 48 | 4 | 24.8 | 20 | 65.2 |
| Example 1-2 | Si$_{60}$Sn$_{10}$Ti$_{30}$ | 0.03 | 36 | 6 | 24.8 | 27 | 65.2 |
| Example 1-3 | Si$_{60}$Sn$_{10}$Ti$_{30}$ | 0.05 | 24 | 8 | 24.8 | 35 | 65.2 |
| Example 1-4 | Si$_{60}$Sn$_{10}$Ti$_{30}$ | 0.05 | 12 | 9 | 24.8 | 40 | 65.2 |
| Comparative Example | Si$_{60}$Sn$_{20}$Ti$_{20}$ | 0.05 | — | 15 | 36.5 | 55 | 43.5 |

|  | Mass ratio of silicide phase/available-Si phase | Distance between Si regular tetrahedrons in amorphous region (nm) | Size of MRO in amorphous region (nm) | Initial discharge capacity (mAh/g) | Discharge capacity retention rate (%) After 50 cycles | Discharge capacity retention rate (%) After 70 cycles |
|---|---|---|---|---|---|---|
| Example 1-1 | 2.63 | 0.48 | 1.3 | 1079 | 96 | 93 |
| Example 1-2 | 2.63 | 0.44 | 1.6 | 1112 | 95 | 88 |
| Example 1-3 | 2.63 | 0.40 | 2.6 | 1205 | 90 | 80 |
| Example 1-4 | 2.63 | 0.40 | 3.2 | 1315 | 87 | 79 |
| Comparative Example | 1.19 | 0.36 | >10 | 1650 | 34 | 23 |

Note)
[—] indicates that it is not measured.

TABLE 2

|  | Composition of silicon-containing alloy | Time for mechanical alloying (stirring) treatment (hr) | a-Si phase Content of available-Si (% by mass) | Silicide phase Content of TiSi$_2$ (% by mass) | Mass ratio of silicide phase/available-Si phase | Distance between Si regular tetrahedrons in amorphous region (nm) | Size of MRO in amorphous region (nm) | Initial discharge capacity (mAh/g) | Discharge capacity retention rate after 50 cycles (%) |
|---|---|---|---|---|---|---|---|---|---|
| Example 2-1 | Si$_{65}$Sn$_5$Ti$_{30}$ | 5 | 29.8 | 65.2 | 2.20 | 0.47 | 2.0 | 1301 | 96 |
| Example 2-2 | Si$_{66}$Sn$_5$Ti$_{29}$ | 5 | 32.0 | 63.0 | 1.97 | 0.47 | 2.7 | 1458 | 97 |
| Example 2-3 | Si$_{67}$Sn$_5$Ti$_{28}$ | 5 | 34.1 | 60.9 | 1.78 | 0.48 | 5.3 | 1480 | 95 |

TABLE 3

|  | Composition of silicon-containing alloy | Time for mechanical alloying (stirring) treatment (hr) | a-Si phase Diameter (nm) | a-Si phase Content of available-Si (% by mass) | Silicide phase Diameter (nm) | Silicide phase Content of TiSi$_2$ (% by mass) | Mass ratio of silicide phase/available-Si phase | Distance between Si regular tetrahedrons in amorphous region (nm) | Size of MRO in amorphous region (nm) | Initial discharge capacity (mAh/g) | Discharge capacity retention rate after 50 cycles (%) |
|---|---|---|---|---|---|---|---|---|---|---|---|
| Example 3-1 | Si$_{68.5}$Sn$_{2.5}$Ti$_{28.5}$Al$_{0.5}$ | 5 | 7 | 35.1 | 25 | 62.4 | 1.78 | 0.48 | 4.3 | 1427 | 95 |
| Example 3-2 | Si$_{69}$Sn$_2$Ti$_{28.5}$Al$_{0.5}$ | 5 | — | 35.6 | — | 62.4 | 1.76 | 0.47 | 5.1 | 1458 | 94 |
| Example 3-3 | Si$_{67.5}$Sn$_2$Ti$_{29}$Al$_{1.5}$ | 5 | — | 33.5 | — | 64.5 | 1.93 | — | — | 1340 | 87 |

Note)
[—] indicates that it is not measured.

From the results presented in Table 1, it can be seen that the lithium ion battery using the negative electrode active material according to the present invention maintains a high discharge capacity retention rate value after 50 cycles/70 cycles and thus exhibits excellent cycle durability. The reason for that high cycle durability has been realized in this manner is because the silicon-containing alloy constituting the negative electrode active material has an alloy composition of a ternary system represented by Si—Sn-M (M is one or two or more transition metal elements) or a quaternary system represented by Si—Sn-M-Al (M is one or two or more transition metal elements) and a structure in which an a-Si phase containing amorphous or low crystalline silicon containing tin in the silicon crystal structure in the form of a solid solution is dispersed in a silicide phase containing a silicide of a transition metal as a main component. Moreover, expansion of the active material particles at the time of charge and discharge is relaxed while suppressing the phase transition from an amorphous state to a crystalline state (crystallization to $Li_{15}Si_4$) when Si is alloyed with Li at the time of charge as the amorphization of a-Si phase further proceeds (that is, as the size of the periodic array region (MRO) in the amorphous region (a-Si phase) has a smaller value). In addition, the intercalation and deintercalation reaction of lithium ions at the time of charge and discharge is more likely to proceed as the distance between Si regular tetrahedrons in the amorphous region (a-Si phase) increases (that is, the distance between Si—Si increases) as tin is present in the a-Si phase in the form of a solid solution. Furthermore, as the silicide phase constitutes the sea (continuous phase) of a sea-island structure, it is possible to even further improve the electron conductivity of the negative electrode active material (silicon-containing alloy) and also to prevent cracking of the active material by relaxing the stress at the time of expansion of the a-Si phase. The silicon-containing alloy constituting the negative electrode active material according to the present invention has a predetermined microtextural structure, and as a result, it is considered that the improvement in cycle durability is brought about as a combined effect of these. It can be seen that the mass ratio of the silicide phase/a-Si phase can even further contribute to the improvement in cycle durability as it has a value equal to or greater than a predetermined value.

Figure 8:
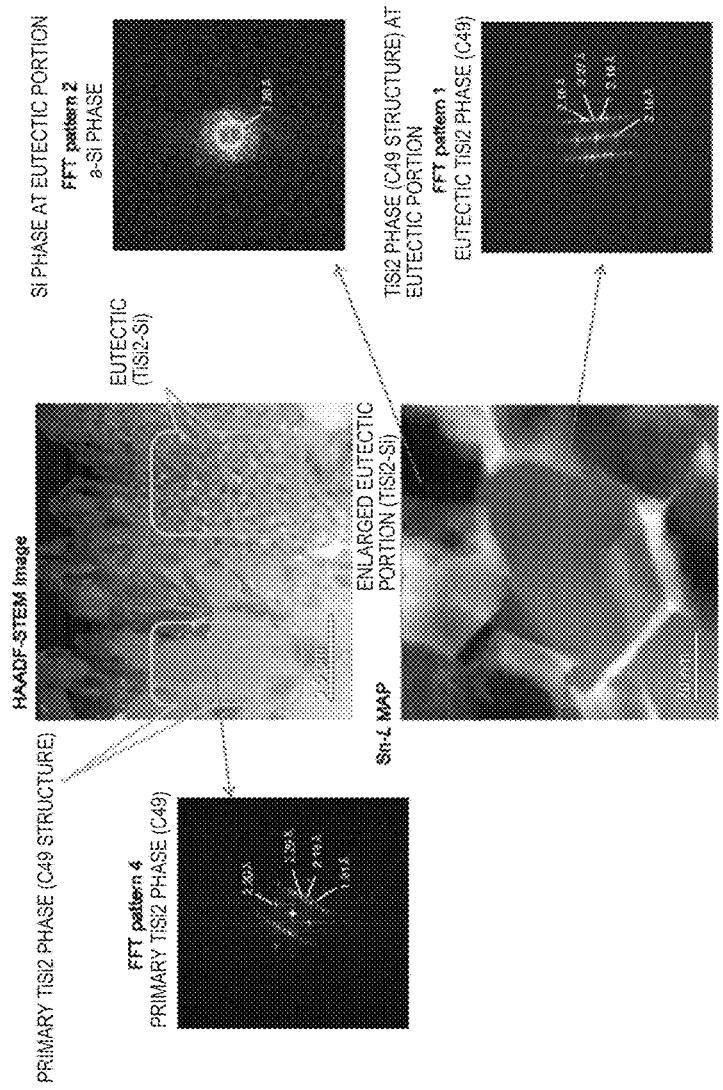
FIG. 8 is a photograph which illustrates the observation results for the microtextural structure of a crushed material (crushed material of quenched thin strip obtained by a liquid quenching solidification method) before being subjected to a mechanical alloying treatment when producing the negative electrode active material (silicon-containing alloy) of Example 1-1 by HAADF-STEM. In addition, FIG. 8 also illustrates a diffraction pattern acquired by subjecting the respective portions (primary silicide phase, eutectic a-Si phase, and eutectic silicide phase) in the observation image to fast Fourier transformation processing.

Incidentally, the microtextural structure of a crushed material (crushed material of quenched thin strip obtained by a liquid quenching solidification method) before being subjected to a mechanical alloying treatment when producing the negative electrode active material (silicon-containing alloy) of the Example 1-1 was observed by HAADF-STEM. The observation image obtained as the result is illustrated in FIG. 8. As apparent from the HAADF-STEM observation image illustrated in FIG. 8, it has been demonstrated that the quenched thin strip obtained by a liquid quenching solidification method has a microtextural structure in which a texture (to be considered as a primary crystal texture) which is composed of a disilicide ($TiSi_2$) and a eutectic texture of the silicide and an a-Si phase are present together. In addition, a diffraction pattern acquired by subjecting the respective portions (primary silicide phase, eutectic a-Si phase, and eutectic silicide phase) in the observation image to fast Fourier transformation processing is also illustrated in FIG. 8. It has been confirmed that the crystal structure of a disilicide ($TiSi_2$) contained in the quenched thin strip obtained by a liquid quenching solidification method is a C49 structure from the diffraction pattern illustrated in FIG. 8. It is considered that the silicide phase is sufficiently destroyed and likely to be dispersed in the alloy to be finally obtained even without being subjected to a mechanical alloying treatment for a long time when a negative electrode active material (silicon-containing alloy) is produced by subjecting this quenched thin strip to a mechanical alloying treatment since a disilicide ($TiSi_2$) having a C49 structure has a lower hardness than that having a C54 structure. Incidentally, it has also been confirmed that the disilicide ($TiSi_2$) contained in the negative electrode active material (silicon-containing alloy) obtained by conducting a mechanical alloying treatment has a C54 structure although the data are not illustrated.

In addition, from the results presented in the Example 2 and the Example 3, it can be seen that it is possible to obtain a negative electrode active material (silicon-containing alloy) having the same performance (cycle durability) as that of a negative electrode active material obtained by conducting a mechanical alloying treatment for a longer time by conducting the mechanical alloying treatment using a stirring ball mill to apply a greater centrifugal force.

REFERENCE SIGNS LIST

10 and 50 Lithium ion secondary battery (stacked type battery)
11 Negative electrode current collector
12 Positive electrode current collector
13 Negative electrode active material layer
15 Positive electrode active material layer
17 Electrolyte layer
19 Single battery layer
21 and 57 Power generating element
25 and 58 Negative electrode current collecting plate
27 and 59 Positive electrode current collecting plate
29 and 52 Battery outer packaging material (laminate film)

The invention claimed is:

1. A negative electrode active material for electric device comprising a silicon-containing alloy having
a composition represented by the following Chemical Formula (1):

$$Si_xSn_yM_zAl_wA_a \qquad (1)$$

wherein A is unavoidable impurities, M is one or two or more transition metal elements, x, y, z, w and a represent values of percent by mass, wherein 0<y<100, 0<z<100, 0≤w<100, and x and a are remainders), and
a structure wherein an a-Si phase containing amorphous or low crystalline silicon containing tin in a silicon crystal structure in form of a solid solution is dispersed in a silicide phase containing a silicide of a transition metal as a main component.

2. The negative electrode active material for electric device according to claim 1, wherein a size of a periodic array region (MRO) in an a-Si phase by TEM-MRO analysis is 3.2 nm or less.

3. The negative electrode active material for electric device according to claim 2, wherein the size of the periodic array region (MRO) is 1.6 nm or less.

4. The negative electrode active material for electric device according to claim 1, wherein a diameter of the silicide phase is larger than a diameter of the a-Si phase.

5. The negative electrode active material for electric device according to claim 4, wherein the diameter of the silicide phase is 50 nm or less and the diameter of the a-Si phase is 10 nm or less.

6. The negative electrode active material for electric device according to claim 5, wherein the diameter of the silicide phase is 30 nm or less and the diameter of the a-Si phase is from 5 to 10 nm.

7. The negative electrode active material for electric device according to claim 1, wherein the silicide of a transition metal is $TiSi_2$ and the a-Si phase is amorphous.

8. The negative electrode active material for electric device according to claim 1, wherein w=0, 60≤x≤67, 5≤y≤10, and 28≤z≤30.

9. The negative electrode active material for electric device according to claim 8, wherein a value of a ratio $(m_2/m_1)$ of a mass $(m_2)$ of the silicide phase to a mass $(m_1)$ of an available-Si phase in the silicon-containing alloy is 1.78 or more.

10. The negative electrode active material for electric device according to claim 9, wherein a value of a ratio $(m_2/m_1)$ of a mass $(m_2)$ of the silicide phase to a mass $(m_1)$ of an available-Si phase in the silicon-containing alloy is 1.97 or more.

11. The negative electrode active material for electric device according to claim 1, wherein 60≤x≤69, 1.5≤y≤8, 28≤z≤31, and 0.3≤w≤3.

12. The negative electrode active material for electric device according to claim 11, wherein a value of a ratio $(m_2/m_1)$ of a mass $(m_2)$ of the silicide phase to a mass $(m_1)$ of an available-Si phase in the silicon-containing alloy is 1.75 or more.

13. The negative electrode active material for electric device according to claim 12, wherein a value of a ratio $(m_2/m_1)$ of a mass $(m_2)$ of the silicide phase to a mass $(m_1)$ of an available-Si phase in the silicon-containing alloy is 1.85 or more.

14. The negative electrode active material for electric device according to claim 11, wherein a ratio of a mass $(m_1)$ of an available-Si phase to 100% by mass of the silicon-containing alloy is 33% by mass or more.

15. The negative electrode active material for electric device according to claim 11, wherein it is satisfied that $m_1 \geq 61 - 14.3 \times (m_2/m_1)$ where $m_1$ and $m_2$ denote a mass of an available-Si phase and a mass of the silicide phase in the silicon-containing alloy, respectively.

16. A method of producing the negative electrode active material for electric device according to claim 1, the method comprising:
fabricating a quenched thin strip from a parent alloy having the same composition as a composition of the silicon-containing alloy by a liquid quenching solidification method; and
subjecting the quenched thin strip to a mechanical alloying treatment to obtain the negative electrode active material for electric device containing a silicon-containing alloy.

17. A method of producing the negative electrode active material for electric device according to claim 1, the method comprising:
subjecting a powder of a parent alloy having the same composition as a composition of the silicon-containing alloy to a mechanical alloying treatment using a ball mill apparatus to apply a centrifugal force of 20 [G] or more to obtain the negative electrode active material for electric device containing a silicon-containing alloy.

18. The method of producing a negative electrode active material for electric device according to claim 17, wherein time for the mechanical alloying treatment is 45 hours or shorter.

19. A negative electrode for electric device, comprising the negative electrode active material for electric device according to claim 1.

20. An electric device comprising the negative electrode for electric device according to claim 19.

21. The method of producing a negative electrode active material for electric device according to claim 17, wherein the ball mill apparatus is a stirring ball mill apparatus.

* * * * *